(12) United States Patent
    Melville et al.

(10) Patent No.: US 12,117,609 B2
(45) Date of Patent: Oct. 15, 2024

(54) HYBRID OPTICAL FIBER MEMS SCANNER

(71) Applicant: Magic Leap, Inc., Plantation, FL (US)

(72) Inventors: Charles David Melville, Camano Island, WA (US); Steven Alexander-Boyd Hickman, Seattle, WA (US); Laura Cristina Trutoiu, Seattle, WA (US); Keith Lane Behrman, New York, NY (US)

(73) Assignee: Magic Leap, Inc., Plantation, FL (US)

( * ) Notice: Subject to any disclaimer, the term of this patent is extended or adjusted under 35 U.S.C. 154(b) by 767 days.

(21) Appl. No.: 17/133,417

(22) Filed: Dec. 23, 2020

(65) Prior Publication Data

US 2021/0191108 A1    Jun. 24, 2021

Related U.S. Application Data

(63) Continuation of application No. PCT/US2019/039088, filed on Jun. 25, 2019.

(Continued)

(51) Int. Cl.
   *G02B 26/10*    (2006.01)
   *G02B 6/26*     (2006.01)
   (Continued)

(52) U.S. Cl.
   CPC .......... *G02B 26/103* (2013.01); *G02B 6/262* (2013.01); *G02B 26/101* (2013.01);
   (Continued)

(58) Field of Classification Search
   CPC ...... G02B 26/103; G02B 6/262; G02B 26/10; G02B 26/101; G02B 6/3566;
   (Continued)

(56) References Cited

U.S. PATENT DOCUMENTS 3,544,201 A    12/1970   Fowler et al.
6,845,190 B1 *  1/2005   Smithwick ......... A61B 1/00172
                                                    385/11

(Continued)

FOREIGN PATENT DOCUMENTS

EP    1655629 A2 *  5/2006 ........... G02B 26/101
EP    3062138 A1 *  8/2016 ......... A61B 1/00006
(Continued)

OTHER PUBLICATIONS

U.S. Appl. No. 17/132,655 , "Non-Final Office Action", Apr. 25, 2023, 6 pages.

(Continued)

*Primary Examiner* — Michelle R Connelly
(74) *Attorney, Agent, or Firm* — KILPATRICK TOWNSEND & STOCKTON LLP

(57) ABSTRACT

An optical scanner includes a cantilevered optical member protruding from the base portion and a transducer assembly comprising one or more piezoelectric actuators coupled to the cantilevered optical member and configured to induce motion of the cantilevered optical member in a scan pattern. In some cases, the cantilevered optical member has a tapered shape with a distal end narrower than a proximal end adjacent to the base portion of the optical scanner. In some cases, the cantilevered optical member has an elongated width along a first plane and includes a plurality of waveguides. The transducer assembly is configured to induce motion of the cantilevered optical member in a second plane orthogonal to the first plane.

20 Claims, 29 Drawing Sheets

Related U.S. Application Data

(60) Provisional application No. 62/690,279, filed on Jun. 26, 2018, provisional application No. 62/691,560, filed on Jun. 28, 2018, provisional application No. 62/840,298, filed on Apr. 29, 2019.

(51) Int. Cl.
   *G02B 27/01* (2006.01)
   *G02B 6/00* (2006.01)

(52) U.S. Cl.
   CPC ..... *G02B 27/0172* (2013.01); *G02B 27/0176* (2013.01); *G02B 2006/0098* (2013.01); *G02B 2027/0178* (2013.01)

(58) Field of Classification Search
   CPC ........ G02B 2006/0098; A61B 1/00172; A61B 1/07; A61B 5/0062; A61B 1/00165
   See application file for complete search history.

(56) References Cited

U.S. PATENT DOCUMENTS

| | | | | |
|---|---|---|---|---|
| 7,583,872 | B2* | 9/2009 | Seibel | A61B 1/00172 385/25 |
| 7,738,762 | B2* | 6/2010 | Melville | A61B 5/0084 385/116 |
| 9,874,739 | B2* | 1/2018 | Tsuruta | A61B 1/00172 |
| 11,899,197 | B2 | 2/2024 | Melville | |
| 2001/0055462 | A1* | 12/2001 | Seibel | A61B 1/00048 385/33 |
| 2004/0122328 | A1* | 6/2004 | Wang | A61B 1/0655 600/476 |
| 2007/0019906 | A1* | 1/2007 | Melville | G02B 6/3578 385/25 |
| 2009/0028407 | A1* | 1/2009 | Seibel | A61B 1/0627 382/131 |
| 2009/0235396 | A1 | 9/2009 | Wang et al. | |
| 2009/0289747 | A1 | 11/2009 | Duraffourg et al. | |
| 2012/0080612 | A1 | 4/2012 | Grego et al. | |
| 2013/0208330 | A1 | 8/2013 | Naono | |
| 2013/0324858 | A1 | 12/2013 | Xu et al. | |
| 2015/0164311 | A1 | 6/2015 | Yu et al. | |
| 2015/0268415 | A1 | 9/2015 | Schowengerdt et al. | |
| 2017/0010462 | A1* | 1/2017 | Yokota | G02B 23/2469 |
| 2018/0107007 | A1 | 4/2018 | Wyrwas et al. | |
| 2018/0275396 | A1 | 9/2018 | Schowengerdt et al. | |
| 2019/0155019 | A1 | 5/2019 | Melville et al. | |

FOREIGN PATENT DOCUMENTS

| | | |
|---|---|---|
| WO | 2020006008 A1 | 1/2020 |
| WO | 2020006011 A1 | 1/2020 |

OTHER PUBLICATIONS

PCT/US2019/039084, "International Preliminary Report on Patentability", Jan. 7, 2021, 14 pages.
PCT/US2019/039084, "International Search Report and Written Opinion", Nov. 19, 2019, 11 pages.
PCT/US2019/039084, "Invitation to Pay Additional Fees and, Where Applicable, Protest Fee", Sep. 18, 2019, 2 pages.
PCT/US2019/039088, "International Preliminary Report on Patentability", Jan. 7, 2021, 8 pages.
PCT/US2019/039088, "International Search Report and Written Opinion", Sep. 24, 2019, 10 pages.
U.S. Appl. No. 17/132,655, "Notice of Allowance", Oct. 30, 2023, 8 pages.

* cited by examiner

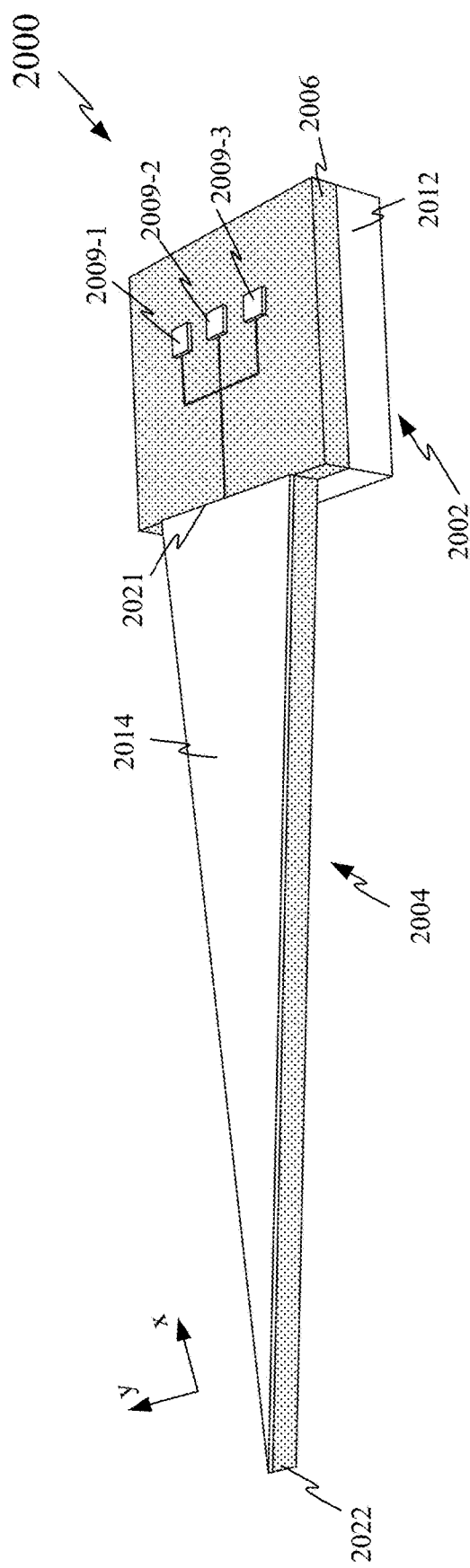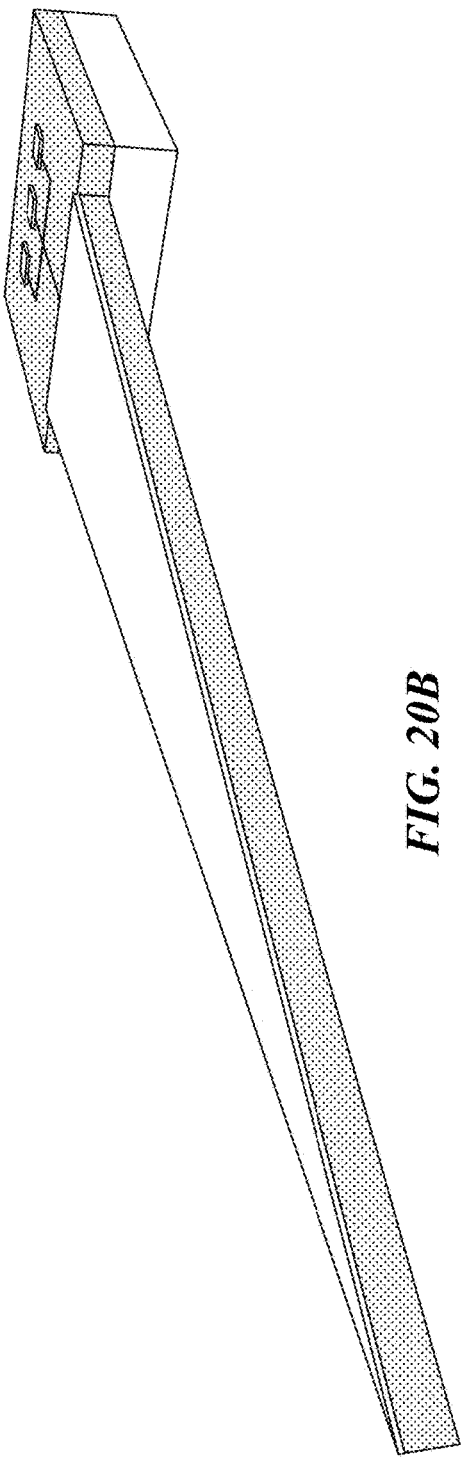
*FIG. 20A*
*FIG. 20B*

HYBRID OPTICAL FIBER MEMS SCANNER

CROSS-REFERENCES TO RELATED APPLICATIONS

This application is a continuation of International Patent Application No. PCT/US2019/039088, filed Jun. 25, 2019, entitled "HYBRID OPTICAL FIBER MEMS SCANNER," which claims the benefit of priority to U.S. Provisional Patent Application No. 62/690,279, filed Jun. 26, 2018, entitled "RASTER SCANNED PROJECTOR WITH MICROELECTROMECHANICAL SYSTEM SCANNER," U.S. Provisional Patent Application No. 62/691,560, filed Jun. 28, 2018, entitled "HYBRID OPTICAL FIBER MEMS SCANNER," and U.S. Provisional Patent Application No. 62/840,298, filed Apr. 29, 2019, entitled "HYBRID OPTICAL FIBER MEMS SCANNER," the entire disclosures of which are hereby incorporated by reference, for all purposes, as if fully set forth herein. This application is related to International Patent Application No. PCT/US2019/039084, filed Jun. 25, 2018, entitled "RASTER SCANNED PROJECTOR WITH MICROELECTROMECHANICAL SYSTEM SCANNER," the entire disclosure of which is hereby incorporated by reference, for all purposes, as if fully set forth herein.

BACKGROUND OF THE INVENTION

Modern computing and display technologies have facilitated the development of systems for virtual or augmented reality experiences, where digitally reproduced images or portions thereof are presented to a viewer in a manner wherein they seem to be, or may be perceived as real. A virtual reality, or "VR," scenario typically involves presentation of digital or virtual image information without transparency to other actual real-world visual input; an augmented reality, or "AR" scenario typically involves presentation of digital or virtual image information as an augmentation to visualization of the actual world around the viewer.

Despite the progress made in these display technologies, there is a need in the art for improved methods and systems related to augmented reality systems, particularly, display systems.

SUMMARY OF THE INVENTION

Since the advent of the smartphone, the great utility of having a versatile and always available device capable of general purpose computing and multimedia communication has been realized by the public at large. Nonetheless a pronounced drawback of smartphones is the relatively small screen size. Smartphone display screens are a small fraction of the size of even small laptop computer screens.

It is now contemplated that smartphones will eventually be replaced or indispensably supplemented by augmented reality glasses that will, among other things, effectively provide users with a relatively large field of view 3D imagery output system that is accessible to users, at will, whether for business or entertainment purposes.

Beyond merely exceeding the screen size afforded by a laptop and without the encumbrance of carrying a laptop, augmented reality glasses will provide new mixed reality applications that seamlessly integrate the real world and virtual content. This will not only preserve the user's engagement with the real world, but also enable new types of augmentation of the physical world, such as, for example: automatically generated contextually relevant information overlaid on automatically recognized real world objects; communication between remotely situated persons through 3D avatars of each party presented at the other party's location; and mixed reality games that include virtual content behaving realistically, e.g., respecting boundaries of physical objects in the real world.

One form of augmented reality includes a set of transparent eyepieces that is configured to couple light from left and right sources of imagewise modulated light to a user's eyes. Thus, the user can view the real world while simultaneously or concurrently viewing virtual imagery. Separate left and right imagery that is stereoscopically correct may be provided. Additionally, the curvature of the wavefront of light carrying the imagery can be controlled based on the intended distance of virtual objects included in the virtual imagery from the user. Both of the foregoing measures contribute to the user's perception that viewed imagery is three dimensional.

It would be desirable to reduce the size and weight of augmented reality glasses to values approaching those of typical eyeglasses. An obstacle to doing so is often the source of imagewise modulated light. Even highly miniaturized projectors based on 2D focal plane array light modulators as Liquid Crystal on Silicon (LCoS), or Digital Micromirror Device (DMD) will typically occupy a few cubic centimeters of volume and weight a few grams. One highly compact source of imagewise modulated light is the fiber scanner. The fiber scanner includes an optical fiber extending through a piezoelectric drive tube. Construction of the fiber scanner involves painstaking manual assembly procedures which would be a cost issue for a mass produced product.

This disclosure describes various embodiments that relate to transducers for manipulating fiber or cantilevered beam scanners. In particular, a MEMS based transducer is described for manipulating a fiber or cantilevered beam in a circular or spiral pattern.

A fiber scanner is disclosed and includes the following: an optical fiber; a transducer assembly comprising a first subassembly and a second subassembly, wherein at least one of the first subassembly or the second subassembly includes a multi-section channel configured to at least partly receive the optical fiber in a configuration where the optical fiber extends lengthwise in the multi-section channel, the multi-section channel including a flexibly attached hub portion configured to transfer motion to the optical fiber, and at least one transducer mechanically coupled to the flexibly attached hub portion.

In some embodiments, the flexibly attached hub portion is connected to a remaining portion of the at least one of the first subassembly or the second subassembly by a first flexure and a second flexure.

In some embodiments, the channel is a multi-section channel, each of the first subassembly and the second subassembly including a monolithic component that defines a portion of the multi-section channel and also including the flexibly attached hub portion. The optical fiber is disposed in the multi-section channel defined by the first subassembly and the second subassembly.

In some embodiments, the monolithic component of each of the first subassembly and second subassembly includes kinematic alignment features to secure against relative slippage of the first subassembly and the second subassembly.

In some embodiments, the kinematic alignment features include aligned grooves in the monolithic component of the first subassembly and the second subassembly.

In some embodiments, the kinematic alignment features further include cylinders disposed in the aligned grooves.

In some embodiments, the channel includes a fixed portion adjacent to the flexibly attached hub portion and spaced apart from the flexibly attached hub portion to allow for motion of the flexibly attached hub portion.

In some embodiments, the optical fiber includes a first portion having a first diameter, a second portion having a second diameter and a third portion having a third diameter. The second portion is located between the first portion and the third portion, and the first portion is aligned with the fixed portion of the channel and the third portion is aligned with the flexibly attached hub portion.

In some embodiments, the transducer assembly further includes at least one capacitive sensing region.

In some embodiments, the at least one capacitive sensing region includes at least a first capacitive sensing electrode disposed proximate to the optical fiber and a second capacitive sensing electrode disposed proximate to the optical fiber and where at least a portion of the optical fiber disposed proximate to the first capacitive sensing electrode and the second capacitive sensing electrode is covered with electrically conductive material.

In some embodiments, the at least one transducer includes a first piezoelectric transducer and a second piezoelectric transducer, the flexibly attached hub portion includes a first side and a second side and the first piezoelectric transducer is attached to the first side of the flexibly attached hub portion and the second piezoelectric transducer is attached to the second side of the flexibly attached hub portion.

In some embodiments, in each of the first subassembly and the second subassembly, the transducer includes a first piezoelectric transducer and a second piezoelectric transducer such that the fiber scanner includes at least four piezoelectric transducers. Each flexibly attached hub portion includes a first side and a second side and the first piezoelectric transducer is attached to the first side of the flexibly attached hub portion and the second piezoelectric transducer is attached to the second side of the flexibly attached hub portion, the flexibly attached hub portions of the first subassembly and second subassembly positioned adjoining each other forming a flexibly attached hub encompassing the optical fiber.

An optical scanner is disclosed and includes the following: a cantilevered optical member; and a transducer assembly having a first subassembly and a second subassembly. The first and second subassemblies define a multi-section channel configured to at least partly receive the cantilevered optical member in a configuration where the cantilevered optical member extends lengthwise in the multi-section channel. The multi-section channel includes a flexibly attached hub portion configured to transfer motion to the cantilevered optical member, the transducer assembly including at least one transducer mechanically coupled to the flexibly attached hub portion.

In some embodiments, the cantilevered optical member has a tapered shape with a distal end narrower than a proximal end.

An optical scanner is disclosed and includes the following: a first subassembly defining a first side of a multi-section channel and a first hub portion attached to the first subassembly by two or more flexures; an optical fiber coupled to and extending along one or more sections of the multi-section channel; a second subassembly defining a second side of the multi-section channel and a second hub portion attached to the second subassembly by two or more flexures, a first coupling face of the first subassembly being coupled to a second coupling face of the second subassembly; a first piezoelectric actuator having a first end coupled to a fixed portion of the first subassembly and a second end coupled to the first hub portion; and a second piezoelectric actuator having a first end coupled to the second subassembly and a second end coupled to the second hub portion.

According to some embodiments of the present invention, an optical scanner includes a base portion, a cantilevered optical member protruding from the base portion, and a transducer assembly comprising one or more piezoelectric actuators coupled to the cantilevered optical member and configured to induce motion of the cantilevered optical member in a scan pattern.

In some embodiments of the above optical scanner, the transducer assembly includes a plurality of piezoelectric actuators coupled directly to the cantilevered optical member.

In some embodiments, the cantilevered optical member has a tapered shape with a distal end narrower than a proximal end adjacent to the base portion of the optical scanner.

In some embodiments, the base portion includes a layer of monocrystalline silicon, and the cantilevered optical member includes a cantilevered beam integrally formed with and protruding from the layer of monocrystalline silicon.

In some embodiments, each of the plurality of piezoelectric actuators are oriented in a direction substantially parallel to a longitudinal axis of the cantilevered beam.

In some embodiments, the plurality of piezoelectric actuators includes piezoelectric film actuators extending across a surface of the cantilevered optical member.

In some embodiments, the plurality of piezoelectric actuators consists of two piezoelectric film actuators configured to drive the cantilevered optical member in a circular scan pattern.

In some embodiments, the plurality of piezoelectric actuators comprises two piezoelectric film actuators configured to drive the cantilevered optical member in a circular scan pattern.

In some embodiments, the cantilevered optical member has an elongated width along a first plane and include a plurality of waveguides, and the transducer assembly is configured to induce motion of the cantilevered optical member in a second plane orthogonal to the first plane.

In some embodiments, the plurality of waveguides in the cantilevered optical member extends through the base portion to optically receive, in a time-sequential manner, a scanning input light beam that scans across the first plane.

In some embodiments, the base portion includes a curved section having a contour that tracks a trajectory of a tip of a second cantilevered optical member that emits the scanning input light beam that scans across the first plane.

In some embodiments, the second cantilevered optical member includes an optical fiber or a cantilevered beam including a waveguide.

In some embodiments, the first plane is a horizontal plane and the second plane is a vertical plane.

According to some embodiments of the present invention, an optical scanner includes a base portion, a cantilevered optical member protruding from the base portion, and a transducer assembly comprising one or more piezoelectric actuators coupled to the cantilevered optical member. The cantilevered optical member has an elongated width along a first plane and include a plurality of waveguides. The transducer assembly is configured to induce motion of the cantilevered optical member in a second plane orthogonal to the first plane.

In some embodiments of the above optional scanner the base portion includes a layer of monocrystalline silicon. The cantilevered optical member includes a cantilevered beam integrally formed with and protruding from the layer of monocrystalline silicon.

In some embodiments, each of the one or more piezoelectric actuators is oriented in a direction substantially parallel to a longitudinal axis of the cantilevered beam.

In some embodiments, the one or more piezoelectric actuators include piezoelectric film actuators extending in a direction parallel to the first plane across a surface of the cantilevered optical member.

In some embodiments, the first plane is a horizontal plane and the second plane is a vertical plane.

According to some embodiments of the present invention, a two-dimensional optical scanner includes a first one-dimensional optical scanner and a second one-dimensional scanner. The first one-dimensional optical scanner includes a first base portion, a first cantilevered optical member protruding from the first base portion, the first cantilevered optical member including a single waveguide, and a first transducer assembly including one or more first piezoelectric actuators coupled to the first cantilevered optical member and configured to induce the first cantilevered optical member to scan a first output light beam in a first plane. The second one-dimensional optical scanner includes a second base portion, a second cantilevered optical member protruding from the second base portion, the second cantilevered optical member having an elongated width along the first plane and include a plurality of waveguides, and a second transducer assembly including one or more second piezoelectric actuators coupled to the second cantilevered optical member and configured to induce the second cantilevered optical member to scan in a second plane, the second plane being orthogonal to the first plane. The plurality of waveguides in the second cantilevered optical member extends through the second base portion to optically receive the first output light beam from the first one-dimensional optical scanner in a time-sequential manner. The first one-dimensional optical scanner and the second one-dimensional optical scanner are optically coupled to form the two-dimensional optical scanner.

In some embodiments of the above two-dimensional optical scanner, the second base portion of the second one-dimensional optical scanner includes a curved section having a contour that tracks the trajectory of a tip of the first cantilevered optical member in the first one-dimensional optical scanner to improve coupling between the first one-dimensional optical scanner and the second one-dimensional optical scanner.

In some embodiments, the first base portion comprises a layer of monocrystalline silicon, and the first cantilevered optical member including a cantilevered beam integrally formed with and protruding from the layer of monocrystalline silicon. The one or more first piezoelectric actuators the first cantilevered optical member include piezoelectric film actuators disposed on surfaces of the cantilevered beam that are orthogonal to the first plane.

In some embodiments of the above two-dimensional optical scanner, the second base portion includes a layer of monocrystalline silicon, and the second cantilevered optical member includes a cantilevered beam integrally formed with and protruding from the layer of monocrystalline silicon. The one or more second piezoelectric actuators in the second cantilevered optical member includes piezoelectric film actuators disposed on surfaces of the cantilevered beam that are orthogonal to the second plane.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which:

FIGS. 20A-20B show two perspective views of an optical scanner having a tapered cantilevered member according to an embodiment of the present invention;

DETAILED DESCRIPTION OF THE INVENTION

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Image generating components are important to the performance of virtual and augmented reality devices. Image generating components also tend to take up space and utilize substantial portions of a system's energy. One way to address these two problems is to build the image generating components with microelectromechanical system (MEMS) technology. In particular, this disclosure describes an optical scanner configuration built using MEMS technology.

The optical scanner can include a transducer assembly that includes two subassemblies formed from silicon wafers that cooperatively form a multi-section channel within which a light carrying component, such as an optical fiber or beam with waveguides, can be secured. Each of the subassemblies can include a partially free-floating hub that forms a portion of the multi-section channel within which the optical fiber is positioned. While specific examples of optical fibers or cantilevered beams will be used for the balance of the disclosure, this should not be construed as limiting and it should be appreciated that an optical fiber, cantilevered beam or other cantilevered member configured to emit light could be utilized in the various disclosed embodiments described herein. Piezoelectric actuators coupled with the hub portion are then able to cooperatively manipulate the optical fiber in a manner that causes the optical fiber to move in a desired scan pattern. A synchronization component can be configured to provide inputs to both the piezoelectric actuators and to light generators optically coupled with the optical fiber so that light emitted by the optical fiber is able to correctly display imagery to a user. In some embodiments, the two assemblies can include capacitive sensing regions configured to enable feedback control by tracking a position of the optical fiber during operation of the optical scanner.

These and other embodiments are discussed below with reference to the following figures. However, those skilled in the art will readily appreciate that the detailed description given herein with respect to these figures is for explanatory purposes only and should not be construed as limiting.

Figure 1:
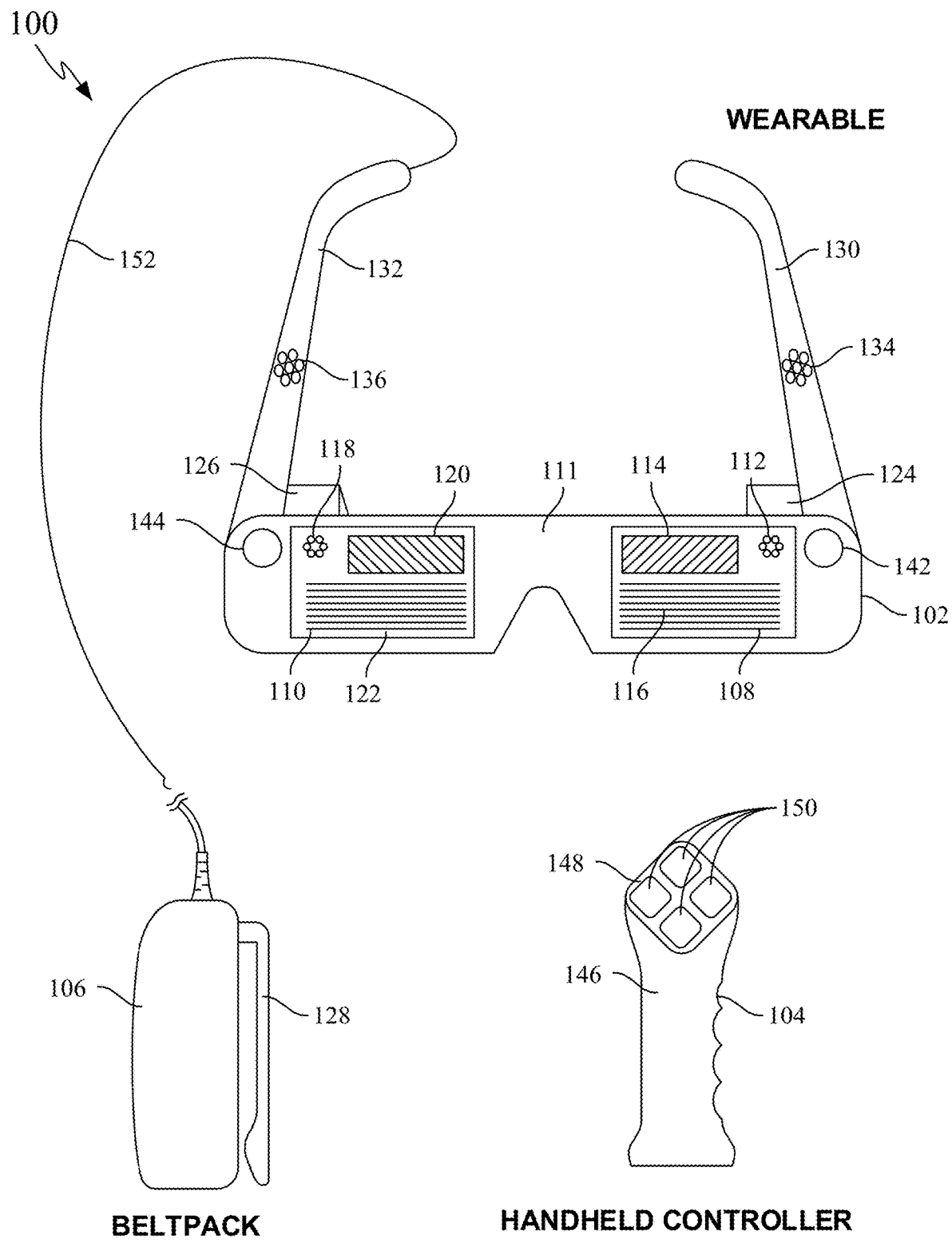
FIG. 1 shows an exemplary augmented reality system according to an embodiment of the present invention.

FIG. 1 shows an exemplary augmented reality system 100 according to an embodiment of the present invention. As shown in FIG. 1, the system 100 includes augmented reality headgear 102, a handheld controller 104, and an auxiliary unit 106. The augmented reality headgear 102 includes a left (user's left) transparent waveguide set eyepiece (herein below "left eyepiece") 108 and a right transparent waveguide set eyepiece (herein below "right eyepiece") 110. Each eyepiece 108, 110 includes surface diffractive optical elements for controlling the flow of imagewise modulated light. Eyepieces 108 and 110 are held in position by optical frame 111. The left eyepiece 108 includes a left incoupling grating 112, a left orthogonal pupil expansion (OPE) grating 114 and a left exit (output) pupil expansion (EPE) grating 116. Similarly, the right eyepiece 110 includes a right input coupling grating 118, a right OPE grating 120 and a right EPE grating 122. Imagewise modulated light is transferred via the input coupling gratings 112, 118, OPEs 114, 120 and EPE 116, 122 to a user's eye. Alternatively, in lieu of the input coupling grating 112, 118, OPE grating 114, 120 and EPE grating 116, 122 the eyepieces 108, 110 include refractive and reflective features for controlling the coupling of imagewise modulated light to the user's eyes.

A left source of imagewise modulated light 124 is optically coupled into the left eyepiece 108 through the left incoupling grating set 112 and a right source of imagewise modulated light 126 is optically coupled into the right eyepiece 110 through the right incoupling grating set 118. The input coupling grating sets 112, 118 deflect light from sources of imagewise modulated light 124, 126 to angles above the critical angle for Total Internal Reflection (TIR) for the eyepieces 108, 110. The OPE grating sets 114, 120 incrementally deflect light propagating by TIR down toward the EPE grating sets 116, 122. The EPE grating sets 116, 122 incrementally couple light out toward the user's face including the user's eyes' pupils. Each eyepiece 108, 110 can include multiple waveguide planes used to handle different color components and/or provided with EPE grating sets 116, 122 having different grating line curvatures in order to impart different wavefront curvatures (corresponding to different virtual image distances) to imagewise modulated light.

The auxiliary unit 106 can include a battery to provide energy to operate the system 100, and can include a processor for executing programs to operate the system 100. As shown, the auxiliary unit 106 includes a clip 128 that is useful for attaching the auxiliary unit 106 to a user's belt. Alternatively, the auxiliary unit 106 can have a different form factor.

The augmented reality headgear 102 also includes a left temple arm 130 and a right temple arm 132. The left temple arm 130 includes a left temple speaker port 134 and the right temple arm 132 includes a right temple speaker port 136. The handheld controller 104 includes a grip portion 146 and a top 148 that includes a plurality of buttons 150. The auxiliary unit 106 is coupled to the headgear 102 through a cable 152, which can, for example, include electrical wires and fiber optics. Wireless connections between the auxiliary unit 106 and the headgear 102 can also be used. World cameras 142 and 144 are shown oriented outwardly to cooperatively cover a front facing portion of a user's field of view. In this way, augmented reality headgear 102 is able to incorporate digital content with real-world items surrounding the user. In some embodiments, world cameras 142 and 144 can include or cooperatively operate in conjunction with depth detection sensors to fully characterize a user's surroundings.

Figure 2:
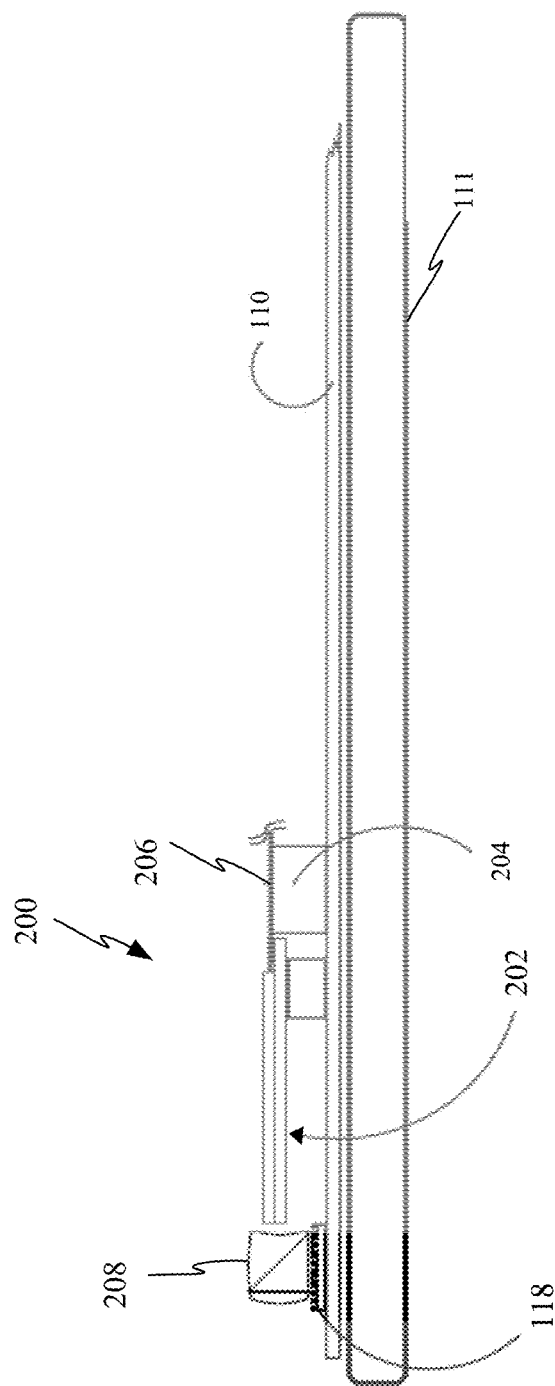
FIG. 2 shows a top view revealing an exemplary configuration that includes an optical scanner affixed to a rear-facing surface of an eyepiece according to an embodiment of the present invention.

FIG. 2 shows a top view revealing an exemplary configuration that includes an optical assembly 200 according to an embodiment of the present invention. Optical assembly 200 includes optical scanner 202 affixed to a rear-facing surface of eyepiece 110. By orientating optical scanner 202 in this manner, an overall thickness of an optical stackup can be reduced. Optical scanner 202 is depicted being affixed to eyepiece 110 by mechanical support structure 204. In some embodiments, mechanical support structure 204 can instead be affixed to optical frame 111 to avoid adverse interaction between mechanical support structure 204 and eyepiece 110. In some embodiments, an optically reflective material can be affixed between mechanical support structure 204 and eyepiece 110 in order to reduce the occurrence of light being prematurely decoupled from eyepiece 110. Light can be delivered to optical scanner 202 by optical fiber 206. Light from optical fiber 206 is then distributed in a predefined scan pattern by optical scanner 202. The predefined pattern is then received and transmitted to input coupling grating 118 by collimating and coupling optic 208. It should be appreciated that other cantilevered structures aside from optical fiber 206 are also possible. For example, a silicon beam including one or more optical waveguides can also be used in lieu of optical fiber 206.

Figure 3:
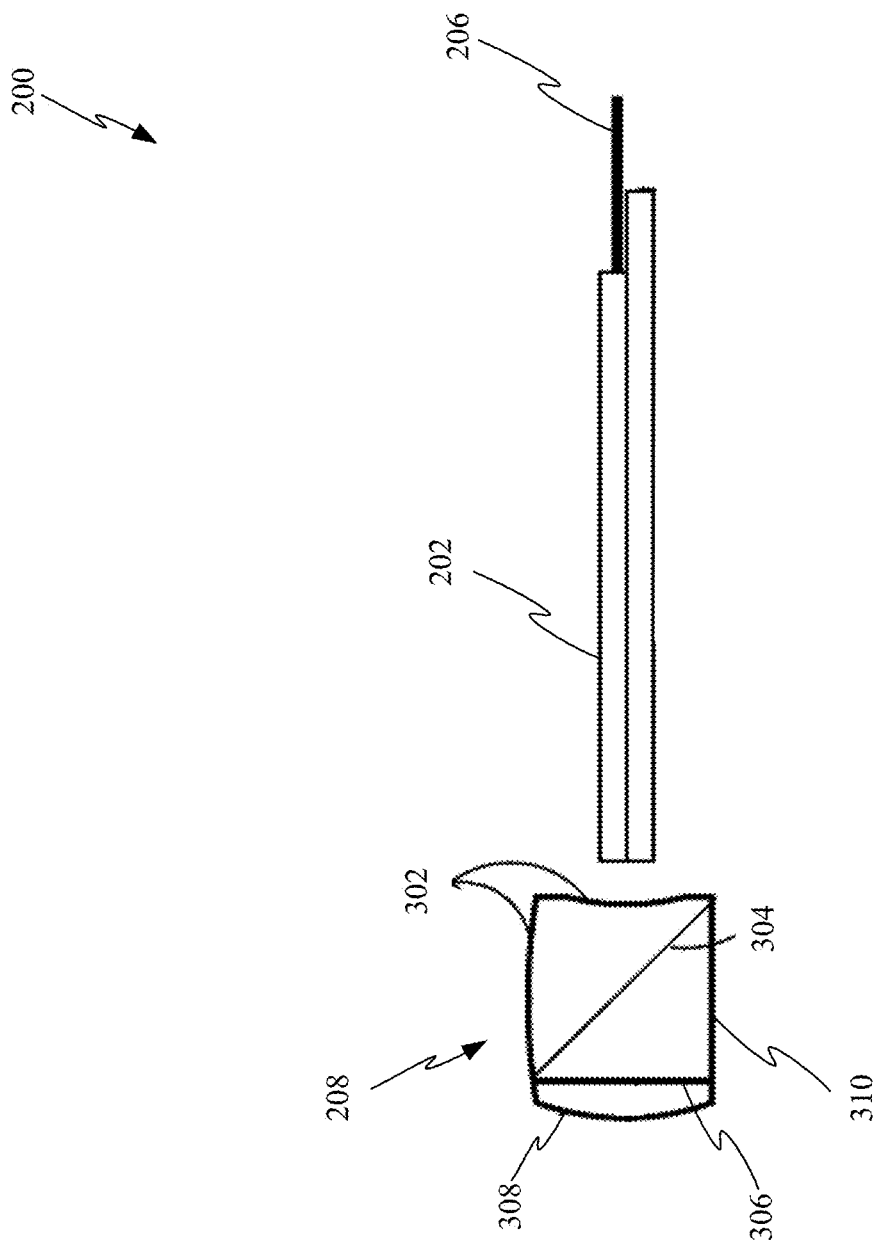
FIG. 3 shows a close up view of the optical assembly depicted in FIG. 2.

FIG. 3 shows a close up view of optical assembly 200 according to an embodiment of the present invention. In particular, details of collimating and coupling optic 208 are shown and described hereinbelow. Light emitted from optical scanner 202 enters collimating and coupling optic 208 through one of curved refractive surfaces 302. In some embodiments, light generated by optical scanner 202 can be polarized so that substantially all of it passes through polarizing beam splitter 304. The light then passes through quarter wave plate 306 at which point it is converted from linearly polarized light to circular polarized light and then reflects off curved mirror 308. Circular polarized light reflecting off curved mirror 308 results in a reversal of the circular polarization handedness of light. Upon passing through the quarter wave plate 306 a second time, the circular polarized light is then reconverted to linearly polarized light, but with a polarization direction perpendicular to the initial linear polarization. The net effect is that the polarization of the light is reversed so that now instead of passing through beam splitter 304 it reflects off of beam splitter 304 to exit collimating and coupling optic 208 through outcoupling surface 310 to enter input coupling grating 118. The outcoupling surface 310 may also have some optical power. Additional description related to optical assembly 200 is provided in U.S. patent application Ser. No. 15/927,765, titled "Method and System for Fiber Scanning Projector," filed on Mar. 21, 2018, the disclosure of which is hereby incorporated by reference in its entirety for all purposes.

Figure 4:
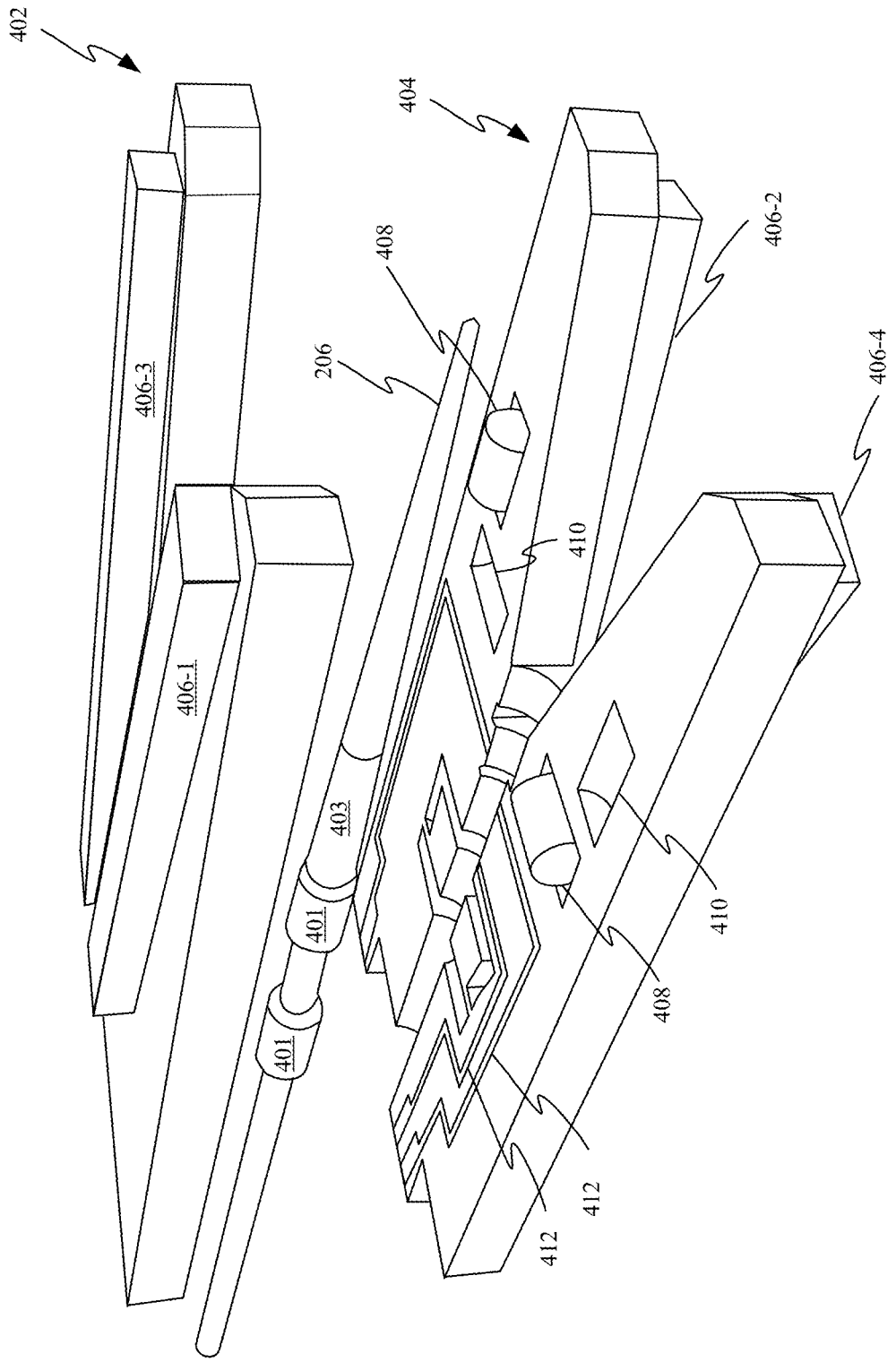
FIG. 4 shows an exploded perspective view of the optical scanner, which includes an upper subassembly, a lower subassembly, and an optical fiber, according to an embodiment of the present invention.

FIG. 4 shows an exploded perspective view of optical scanner 202, which includes optical fiber 206 and a transducer assembly having a base portion including both an upper subassembly 402 and a lower subassembly 404 according to an embodiment of the present invention. Optical fiber 206 includes multiple enlarged diameter portions 401 sized to engage a channel defined by the transducer assembly and metallized segment 403 for interaction with capacitive sensor regions of upper and lower subassemblies 402 and 404. Upper and lower subassemblies 402 and 404 both include piezoelectric actuators 406 coupled to a monolithic component such as a thin silicon substrate. The piezoelectric actuators 406 can be configured to drive optical fiber 206 in a desired scan pattern. Optical scanner 202 can also include kinematic alignment features 408 for aligning upper and lower subassemblies 402 and 404. In this way, any adverse effects on fiber scanning performance due to misalignment of upper and lower subassemblies 402 and 404 can be mitigated or avoided. In some embodiments, kinematic alignment features 408 can take the form of cylindrical members that are positioned within openings 410 defined by upper and lower subassemblies 402 and 404. In some embodiments, upper and lower subassemblies 402 and 404 can be formed from a thin layer of silicon or silicon carbide or another material. Upper and lower subassemblies 402 and 404 can also include electrically conductive pathways 412 formed from electrically conductive material such as copper. It should be noted that in some embodiments, upper and lower subassemblies 402 and 404 can be interchangeable. Pathways on interchangeable assemblies can be arranged so that electrically conductive pathways do not overlap.

Figure 5:
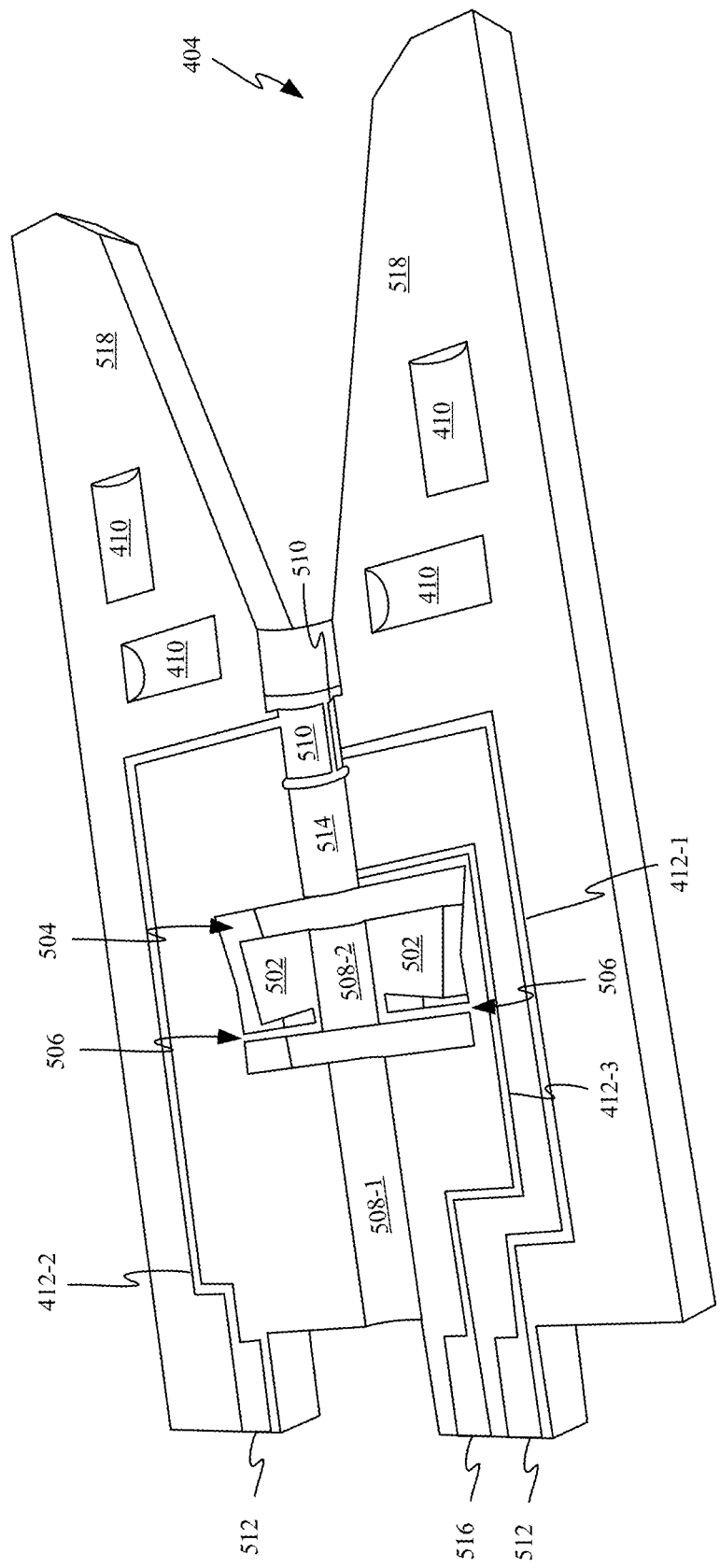
FIG. 5 shows a perspective view of the lower subassembly according to an embodiment of the present invention.

FIG. 5 shows a perspective view of lower subassembly 404 of optical scanner 202 according to an embodiment of the present invention. A hub portion 502 is positioned within an opening 504 defined by lower subassembly 404 and connected to the rest of lower subassembly 404 by flexures 506. In some embodiments, opening 504 can be performed by a subtractive or stamping manufacturing operation. Flexures 506 accommodate movement of hub portion 502 within opening 504. Hub portion 502 also defines a portion of a curved multi-section channel 508 designed to accommodate and support a portion of optical fiber 206. The curvature of multi-section channel 508 is selected in accordance with the shape of the optical fiber that is positioned in the multi-section channel. In the embodiment illustrated in FIG. 4, the optical fiber 206 includes multiple enlarged diameter portions 401 sized to match the shape and size of multi-section channel 508. The increased diameter of enlarged diameter portions 401 allows select portions of optical fiber 206 to remain in direct contact with multi-section channel 508 while other portions of optical fiber 206 are able to move to induce movement of optical fiber 206 in a scan pattern. In particular, section 508-1 of multi-section channel 508 is configured to receive a first enlarged diameter portion 401 and section 508-2 of multi-section channel 508 is configured to receive a second enlarged diameter portion 401 of optical fiber 206. In this way, sections 508-1 and 508-2 can maintain a tight fit with and maintain firm control of the first and second enlarged diameter portions 401 of optical fiber 206.

In some embodiments, a length of optical fiber 206 between enlarged diameter portions 401 can have the same diameter such that fiber 206 has a single enlarged diameter section that can be engaged by both section 508-1 and 508-2 of multi-section channel 508. In such a configuration, a length of section 508-2 can be lengthened to match and support more, most or all of the portion of the single enlarged diameter section not engaged by section 508-1 of multi-section channel 508. For example, section 508-2 can be about two or three times longer than its depicted length to help maintain contact with a larger portion of optical fiber 206.

FIG. 5 also shows how electrically conductive pathways 412-1 and 412-2 can be configured to route electricity between capacitive sensing regions 510 and electrical pads 512. Capacitive sensing regions 510 can be metalized and configured to monitor motion of optical fiber 206 during operation of optical scanner 202. Capacitive sensing regions 510 can be separated by a gap, which allows the two regions to independently sense movement of optical fiber 206. Electrically conductive pathway 412-3 can be configured to route electricity between signal input region 514 and electrical pad 516. Signal input regions 510 can take the form of a metalized surface area. A conductive coating (e.g., metal coating) is formed over segment 403 of optical fiber 206. In the assembled scanner 202 metallized segment 403 on the optical fiber 206 extends axially from signal input region 514 to capacitive sensing regions 510. In the embodiment depicted, the signal input region 514 does not contact metallized segment 403 on the optical fiber 206 however in an alternative embodiment it does. The capacitive sensing regions 510 do not contact metallized segment 403. In operation, an AC signal is capacitively coupled from signal input regions 514 to the conductive coating 417 and capacitively coupled to varying degrees from the conductive coating 417 to the capacitive sensing regions 510. The amplitude of the signal that is capacitively coupled from metallized segment 403 to each of the capacitive sensing regions 510 depends on the instantaneous distance between metallized segment 403 and each particular capacitive sensing region 510. Thus, the position of optical fiber 206 can be sensed by sensing the amplitude of signals coupled into capacitive sensing regions 510. In the embodiment shown, each of upper and lower subassemblies 402 and 404 includes two capacitive sensing regions 510; however, alternatively a different number of capacitive sensing regions 510 is provided. One capacitive sensing regions 510 from each of upper subassembly 402 and lower subassembly 404 may be used in pairs and their signals used as a differential pair to sense the positon of the optical fiber 206. Lower subassembly 404 also includes tapered protrusions 518, which can be used as anchoring points for the piezoelectric actuators 406.

Figure 6:
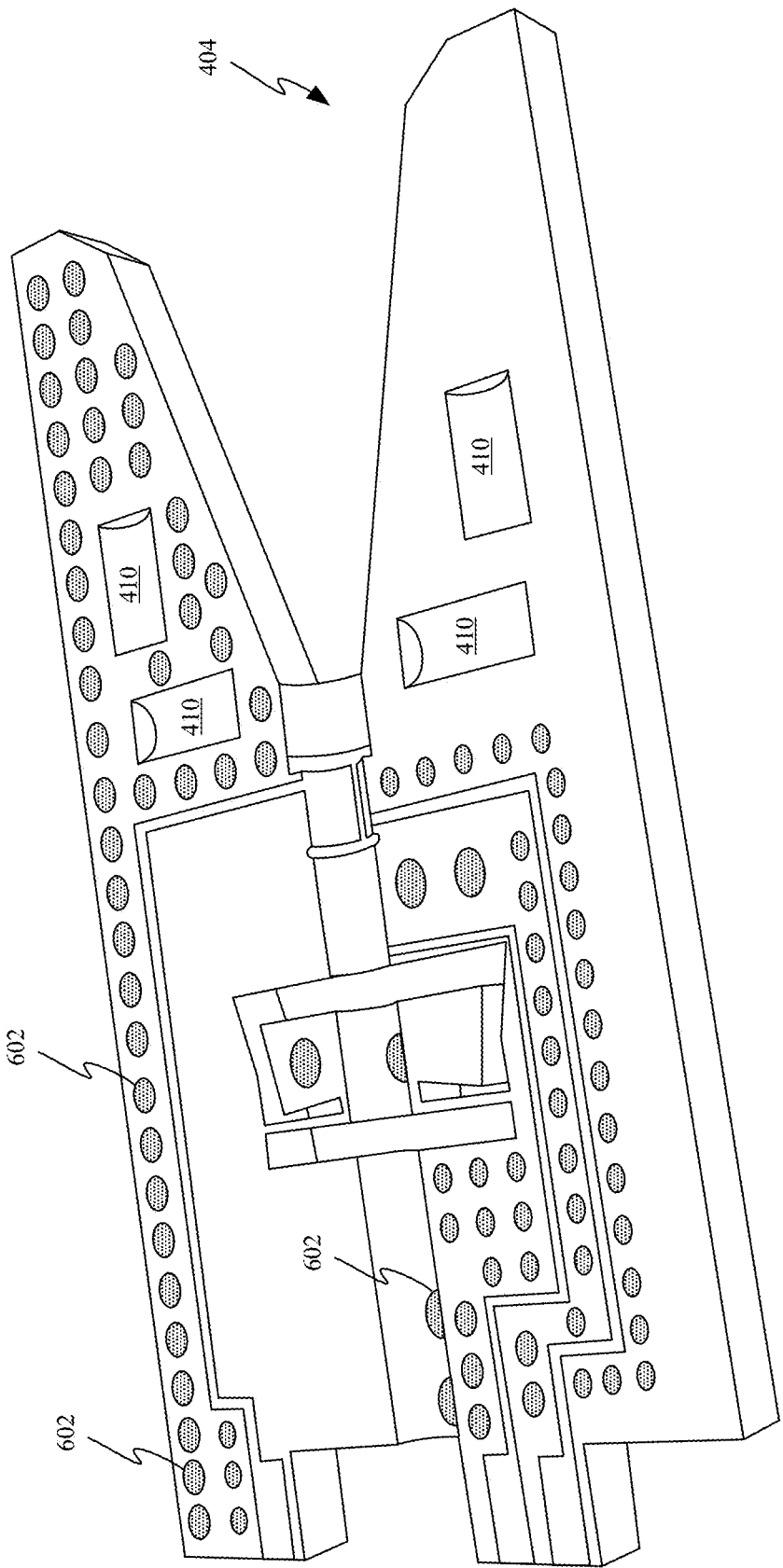
FIG. 6 shows how solder glass can be distributed across a surface of the lower subassembly for adhesion to the upper subassembly according to an embodiment of the present invention.

FIG. 6 shows how glass frit 602, which may also be referred to as solder glass, can be distributed across a coupling surface of lower subassembly 404 according to an embodiment of the present invention. In some embodiments, the glass frit can take the form of clear glass with a relatively low melting point. Alternatively, an adhesive is used in lieu of or in addition to the glass frit. Alternatively, another device or method is used to attach the two subassemblies 402 and 404. Glass frit 602 can act to securely bond lower subassembly 404 to upper subassembly 402. Glass frit 602 can also be utilized to bond optical fiber 206 to both lower subassembly 404 and upper subassembly 402. An area across which glass frit 602 is distributed can be selected so that two identical parts can be bonded together in a manner that distributes glass frit 602 across a majority of the surface depicted in FIG. 6.

Figure 7:
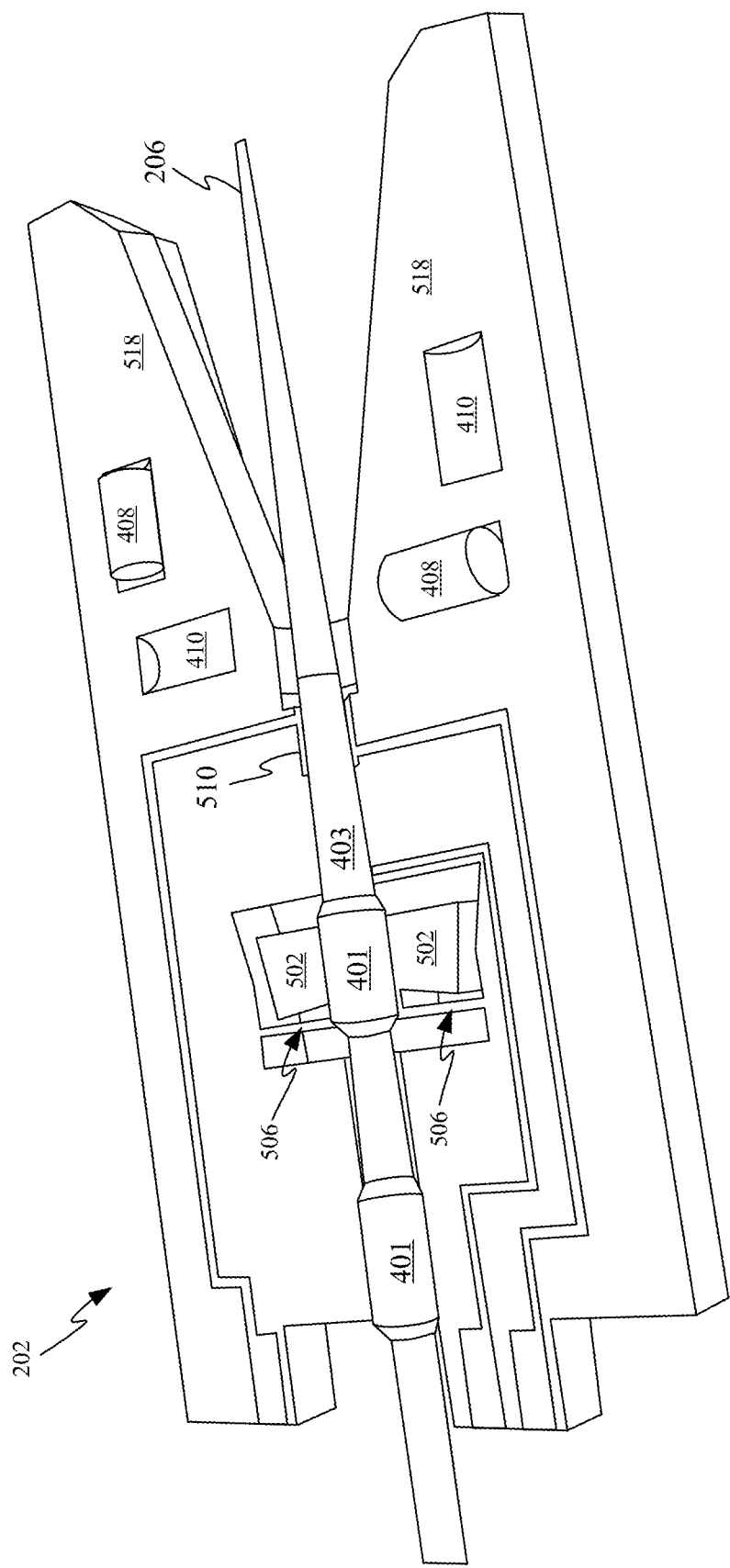
FIG. 7 shows how the optical fiber can be positioned within a multi-section channel of the lower subassembly according to an embodiment of the present invention.

FIG. 7 shows how optical fiber 206 can be positioned lengthwise within multi-section channel 508 of hub portion 502 such that a longitudinal axis of optical fiber 206 is aligned with a longitudinal axis of multi-section channel 508. FIG. 7 also shows how enlarged diameter portions 401 of optical fiber 206 can have a larger diameter than the rest of optical fiber 206 to match a width of multi-section channel 508, thereby helping to keep enlarged diameter portions 401 firmly in place, while allowing other portions of optical fiber 206 to maneuver during operation. In particular, metallized segment 403 of optical fiber 206 can be narrower than multi-section channel 508 so that capacitive sensing regions 510 are able to accurately track movement of segment 403 relative to capacitive sensing regions 510 during operation of optical scanner 202. In some embodiments, a distal end of optical fiber 206 can also be at least partially metallized, allowing other capacitive sensors positioned along tapered protrusions 518 to track movement of the distal end of optical fiber 206.

Figure 8A:
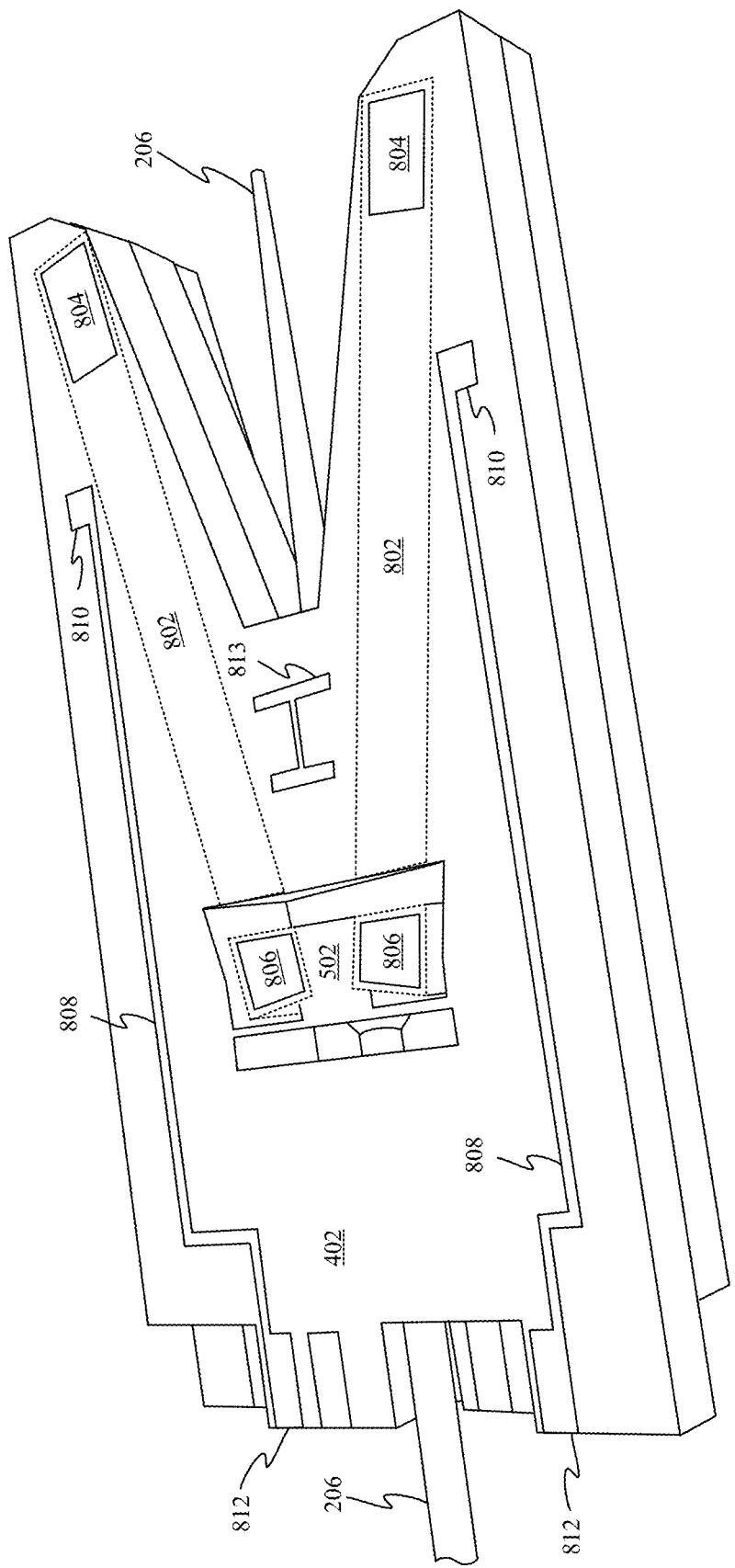
FIG. 8A shows an optical fiber positioned between the upper and lower assemblies according to an embodiment of the present invention.

FIG. 8A shows optical fiber 206 positioned between upper and lower subassemblies 402 and 404 according to an embodiment of the present invention. In some embodiments, upper and lower subassemblies 402 and 404 can be coupled together using glass frit 602. In FIG. 8A, piezoelectric actuators 406 have been removed for the purpose of showing an unobstructed view of an upward-facing surface of upper subassembly 402. Dashed regions 802 show an area across which piezoelectric actuators 406 extend. In some embodiments, a first end of piezoelectric actuators 406 can be coupled to upper subassembly 402 by attachment pads 804. In this way, second ends of each of piezoelectric actuators 406 attached to an attachment pad 806 are able to expand and contract longitudinally in order to shift hub portion 502 relative to upper subassembly 402. A central portion of piezoelectric actuators 406 remain unattached to subassembly 402 and in some embodiments can be elevated above the upward-facing surface of upper subassembly 402 by attachment pads 804 and 806 in order to eliminate friction between piezoelectric actuators 406 and subassembly 402. The upward-facing surface of upper subassembly 402 also includes electrically conductive pathways 808 for carrying electricity and signals between electrically conductive pads 810 and 812. An external drive circuit (e.g., see FIG. 12 below) can be coupled to electrically conductive pads 812. H-shaped opening 813 helps to electrically isolate capacitive sensing regions 510 from each other allowing for a total of four different capacitive sensing regions 510 to monitor movement of optical fiber 206.

Figure 8B:
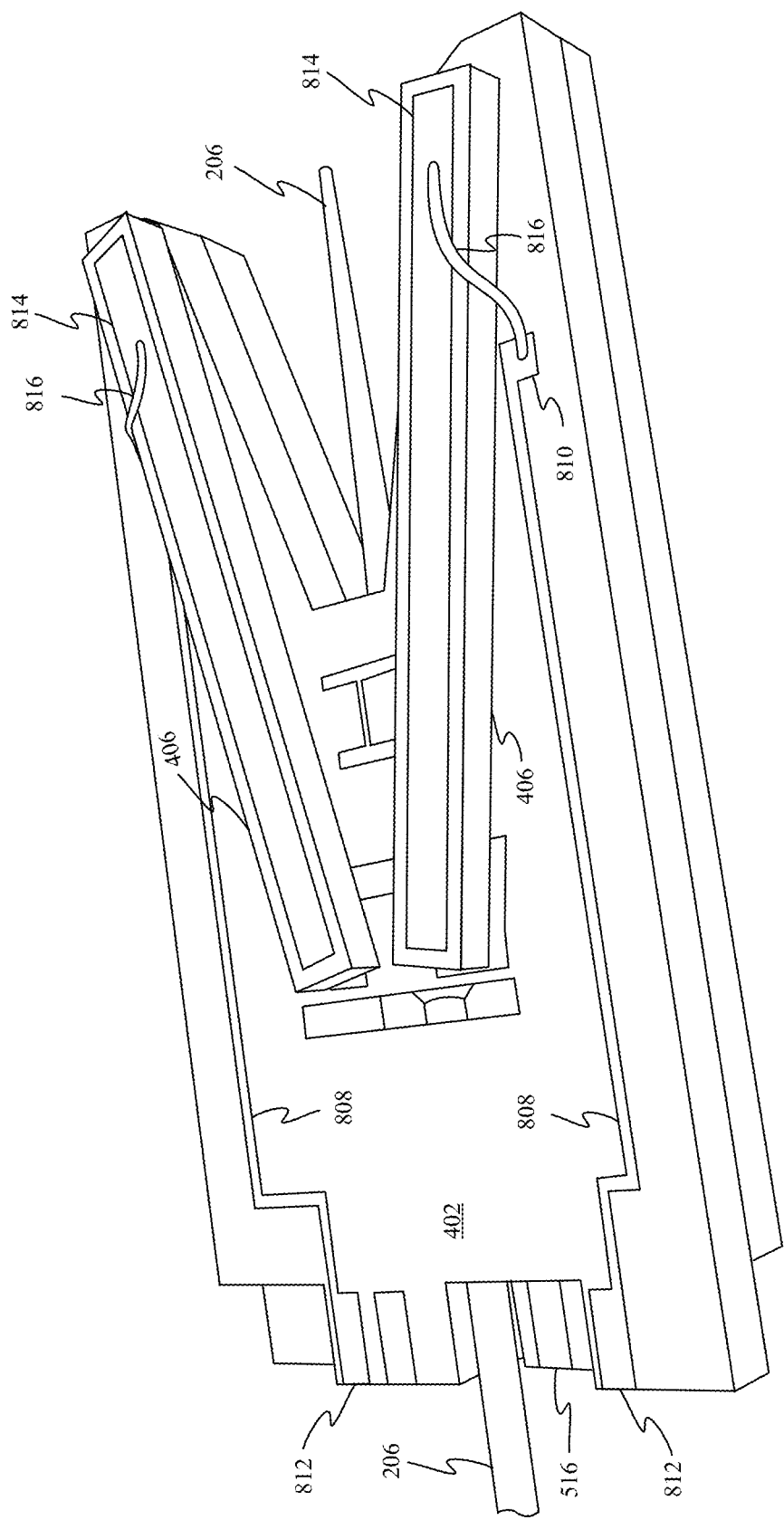
FIG. 8B shows piezoelectric actuators coupled with the upper and lower assemblies according to an embodiment of the present invention.

FIG. 8B shows piezoelectric actuators 406 coupled with upper and lower subassemblies 402 and 404 according to an embodiment of the present invention. Piezoelectric actuators 406 are depicted attached to upper subassembly 402 using electrical pads 804 and 806. In some embodiments, piezoelectric actuators 406 can be electrically coupled to electrically conductive pathways 808 by wire bonding electrical pads 810 to electrical pads 814 of piezoelectric actuator 406 using wire 816. Wire 816 can be configured to bend and/or flex to accommodate movement of piezoelectric actuator 406. In embodiments where wire 816 is attached to piezoelectric actuator 406 directly above electrically conductive pad 804, wire movement can be reduced or eliminated as the end of piezoelectric actuator 406 undergoes very little movement during expansion and contraction.

Figure 9:
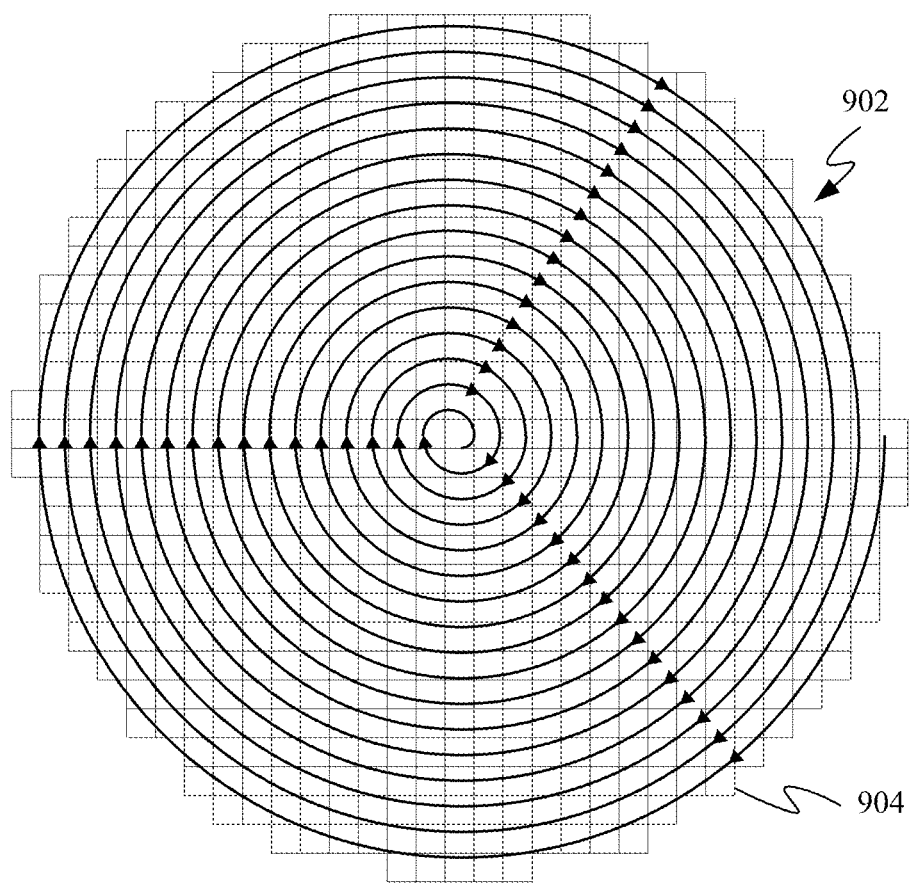
FIG. 9 shows an exemplary spiral scan pattern that can be traversed when the optical fiber is actuated according to an embodiment of the present invention.

FIG. 9 shows an exemplary spiral scan pattern 902 that can be traversed when optical fiber 206 is actuated according to an embodiment of the present invention. While arrows show scan pattern 902 turning in a clockwise pattern it should be understood that scan direction can vary. For example, after a clockwise scan has been completed, a counter-clockwise scan can be initiated from a central region of spiral scan pattern 902, thereby resulting in a reversal in direction of depicted scan pattern 902. The depicted grid of squares 904 can represent pixel locations traversed by spiral scan pattern 902. Because a speed of optical fiber 206 can vary over the course of spiral scan pattern 902, a rate at which light is modulated through optical fiber 206 can be adjusted to keep pace with the speed of the optical fiber so that different colors of light being emitted correctly correspond to pixel locations at squares 904. For example, since optical fiber 206 can travel more slowly through a central portion of scan pattern 902, a rate at which light signals are modulated can be slowed as a light emitting portion of optical fiber 206 approaches the central portion or the rate can remain substantially the same resulting in a higher spatial resolution at the central portion of scan pattern 902. It should be understood that other variations and permutations of the modulation rate are possible.

Figure 10:
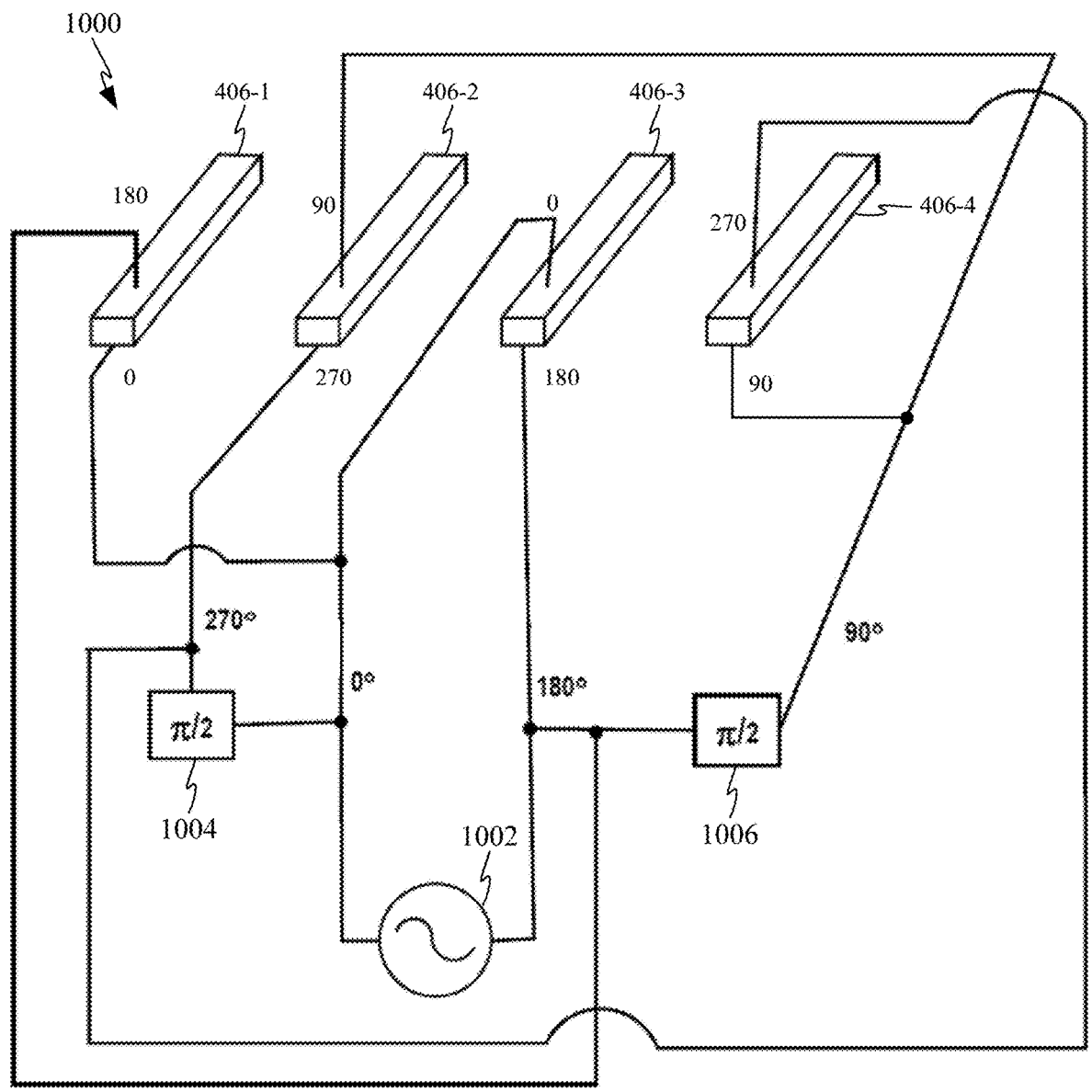
FIG. 10 shows an electric schematic for a four-phase signal splitter network for driving piezoelectric actuators according to an embodiment of the present invention.

FIG. 10 shows an electric schematic for a four-phase signal splitter network 1000 for driving piezoelectric actuators 406 according to an embodiment of the present invention. As illustrated in FIG. 4, piezoelectric actuators 406 can be coupled to upper and lower subassemblies 402 and 404. For purposes of clarity, piezoelectric actuators are illustrated separated from the rest of the piezoelectric scanner. In some embodiments, four phases are applied to piezoelectric actuators 406 arranged on opposing sides of a fiber scanning assembly. Signal generator 1002 provides outputs that are connected to electrically conductive pathways 808, which are in turn, connected to corresponding actuation inputs. Signal generator 1002 is also connected to a first 90° phase shifter 1004 and a second 90° phase shifter 1006, which are connected to piezoelectric actuators 406-1 and 406-4. Thus, signal generator 1002, in concert with the phase shifters 1004 and 1006 provides four phases that are 90° out of phase with respect to each other.

For the purposes of discussion of FIG. 10, it can be considered that all of the piezoelectric actuators 406 are poled in the same vertical direction. The four piezoelectric actuators 406 can be considered to be grouped in two pairs. A first pair is taken to include a first piezoelectric actuator 406-1 and a third piezoelectric actuators 406-3, while a second pair is taken to include a second piezoelectric actuator 406-2 and a fourth piezoelectric actuator 406-4. The four-phase splitter network 1000 is configured such that within each of the aforementioned pairs of actuators, the electric field directions established by network 1000 within piezoelectric actuators with each pair are oppositely directed. Accordingly, when one member of each pair is induced by the applied field acting through the agency of the piezoelectric effect to contract, the other member of the pair will be induced to expand. As shown in FIG. 4 one member of each pair is part of the upper subassembly 402 and the other member of each pair is part of the lower subassembly 404. Additionally, the two members of each pair are on opposite sides of the optical scanner 202 with one of each pair being in the foreground of FIG. 4 and the other of each pair being disposed toward the background of FIG. 4. The two pairs, i.e., the first pair of piezoelectric actuators 406-1 & 406-3 and the second pair of piezoelectric actuators 406-2 & 406-4, can be said to drive two perpendicular axes (denoted X'-axis and Y'-axis) of the scanner 202. For the purposes of discussion, one can imagine the X'-axis rotated about the rest axis of the optical fiber 206 from the plane at which the upper subassembly 402 and lower assembly meet of the scanner and the Y'-axis perpendicular to rest axis of the optical fiber and perpendicular to the X'-axis.

Although as shown in FIG. 10, a single signal generator 1002 is supplying a signal to all four piezoelectric actuators 406, as will be discussed below, alternatively, circuitry may be provided to provide separate phase and amplitude controlled signals to the first (X'-axis) pair of piezoelectric actuators 406-1, 406-3 and second (Y'-axis) pair of piezoelectric actuators 406-2, 406-4.

Figure 11:
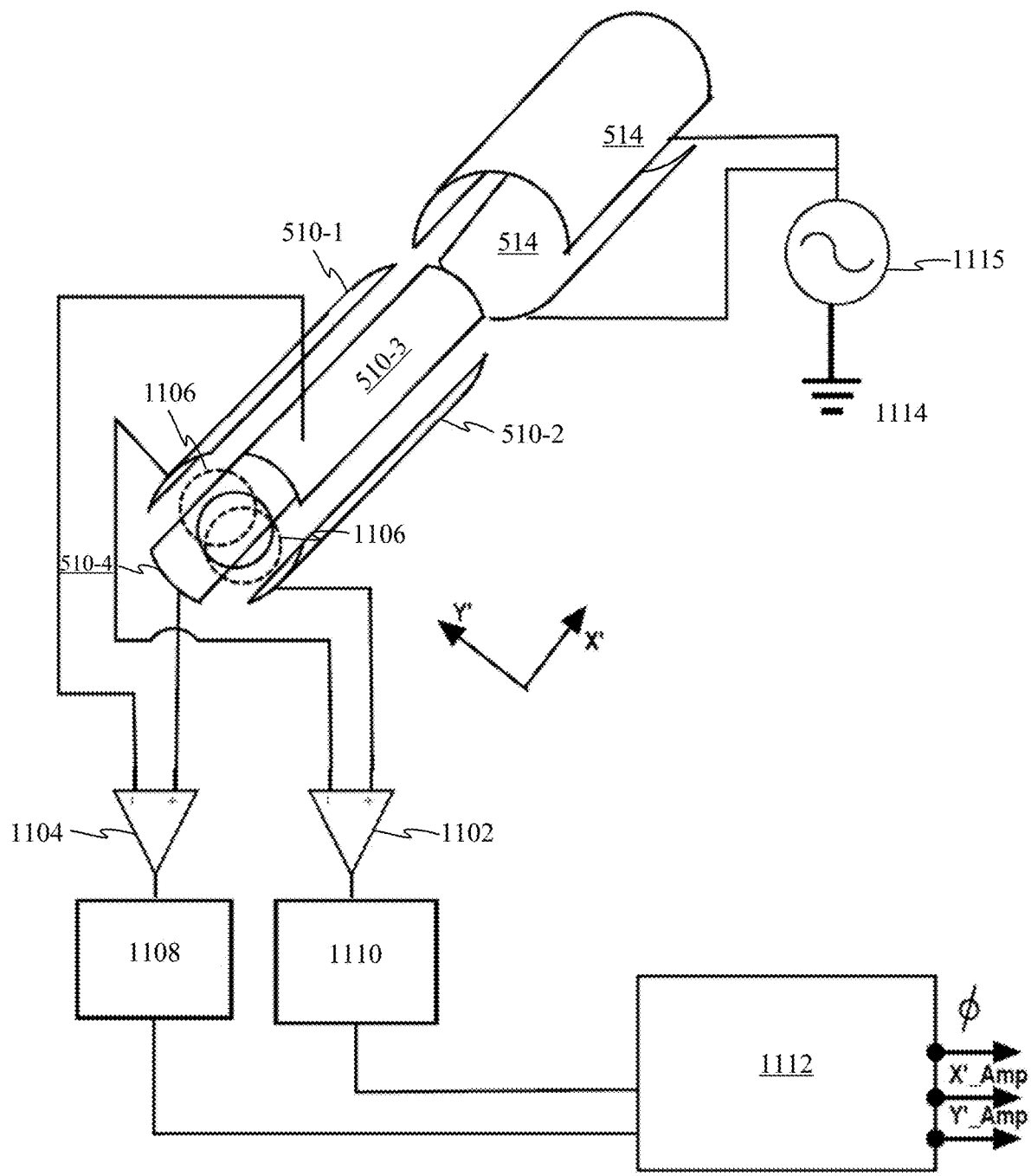
FIG. 11 shows a schematic view of capacitive sensor regions and ground regions of the upper and lower assemblies according to an embodiment of the present invention.

FIG. 11 shows a schematic view of capacitive position sensing components of the optical scanner 202 according to certain embodiments. Referring to FIG. 11, the sensing regions 510 and signal input regions 514 (see also FIG. 5) of the upper and lower subassemblies 402 and 404 are shown. A sense signal generator 1115 is coupled to the signal input regions 514. The sense signal generator 1115 generates a sensing signal that has a frequency that may be much higher than the frequency used to drive the piezoelectric actuators 406. Piezoelectric actuators are capacitively coupled to the metalized portion 704 (FIG. 7) of the optical fiber 206 (see FIGS. 2-4, 7, 8A, and 8B). The frequency of the sensing signal can be much higher than a fundamental resonant frequency of the optical fiber 206, e.g., at least, 10, 100 or 1000 times higher. Accordingly, the sensing signal may not excite any significant mechanical vibration that would disturb the operation of optical scanner 202. The sensing signal that is capacitively coupled into the metalized portion 704 (FIG. 7) of the optical fiber 206, is coactively coupled out of the metalized portion 704 (FIG. 7) of the optical fiber 206 through the sensor regions 510 (which may take the form of conductive electrodes). The sensor regions 510 include a first sensor region 510-1 and an oppositely located second sensor region 510-2 which operate as a pair to detect the position of the optical fiber 206 in the X'-axis direction and a third sensor region 510-3 and an oppositely located fourth sensor region 510-4 which operate as a pair to detect the position of the optical fiber 206 in the Y'-axis direction. According to alternative embodiment, only a single sensor region is used to sense the X'-axis position and/or the Y'-axis position. Sensing signals picked up by the first sensor region 510-1 and the second sensor region 510-2 are input to a first differential amplifier 1102 to which the first and second sensor regions 510-1, 510-2 are coupled. Similarly, the third sensor region 510-3 and the fourth sensor region 510-4 are coupled to a second differential amplifier 1104.

In operation, the magnitude of the sensing signal capacitively coupled to each particular sensing region 510 will increase as the metalized portion 704 of the fiber approaches closer to the particular sensing region. Differential amplifiers 1102 and 1104 are configured to compare position information monitored by opposing sensor regions 510. For example, analysis of a differential between sensor regions 510-1 and 510-2 is used to track the optical fiber positions 1106 depicted in FIG. 11. The sensor readings processed by differential amplifiers 1102 and 1104 are then received by demodulators 1108 and 1110, which serve to eliminate the high frequency component of the sensing signal and extract X' and Y' modulated signals. The modulation of the X' and Y' modulated signals is due to the varying capacitance between the metalized portion 704 of the optical fiber 206 and the signal input regions 514 and the sensor regions 510, and hence is indicative of the X' and Y' instantaneous position of the fiber. Digital signal processor 1112 can then be configured to receive inputs from demodulators 1108 and 1110 in order to track a two-dimensional position of the scanning fiber optic cable. In some embodiments, digital signal processor 1112 can also include models and/or lookup tables that allow it to extrapolate a position of a tip of the scanning fiber optic cable based on the sensor readings originating from sensor regions 510. FIG. 11 shows how digital signal processor can output X', Y' and phase difference between the X' direction oscillation and Y' direction oscillation of the scanning optical fiber, which can be used for feedback control in some embodiments. In normal operation there is about a 90 degree phase difference between the X' direction oscillation and the Y' direction oscillation so that the tip of the optical fiber 206 follows a helical trajectory. FIG. 11 also shows how the sense signal generator 1115 can be coupled to ground 1114. It should be noted that while four different capacitive sensing regions 510 are depicted, alternative configurations with as few as two adjacent capacitive sensing regions 510 are also possible and deemed to be within the scope of the disclosure.

Figure 12:
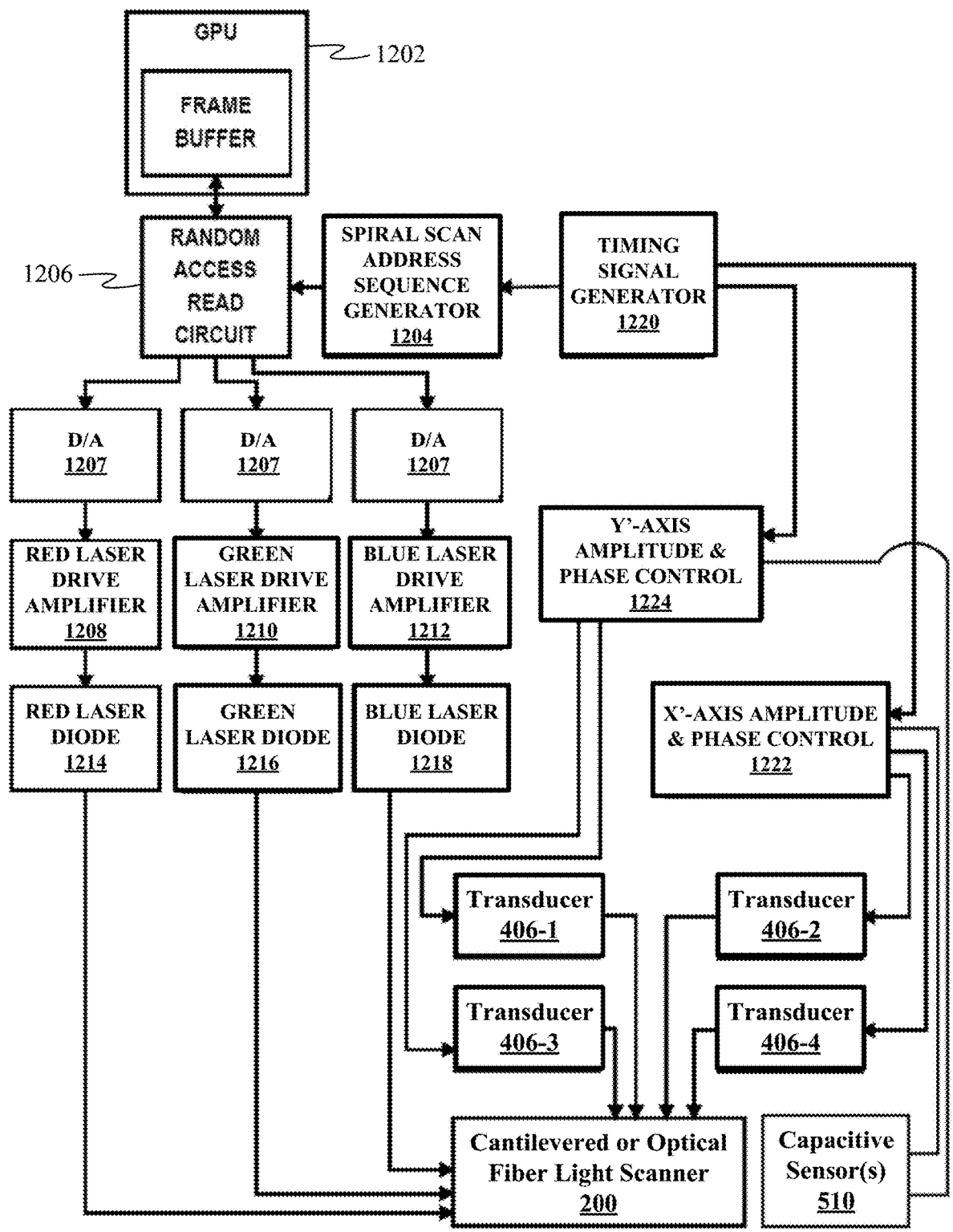
FIG. 12 shows how the actuation and sensing systems described in FIGS. 10-11 can be combined to adjust optical output based upon an actual scan pattern being traversed by an optical fiber or cantilevered beam that supports one or more waveguides according to an embodiment of the present invention.

FIG. 12 shows how the actuation and sensing systems described in FIGS. 10-11 can be combined to adjust optical output based upon an actual scan pattern being traversed by an optical fiber or cantilevered beam that supports one or more waveguides according to an embodiment of the present invention. Graphics Processing Unit (GPU) 1202 includes a frame buffer, which includes image information for a select number of frames of virtual information for display to a user of an augmented reality system. Spiral scan address sequence generator 1204 can be configured to supply a sequence of addresses corresponding to a spiral path of the optical fiber or cantilevered beam. Random access read circuit 1206 can be configured to read data from the frame buffer of GPU 1202 with data from spiral scan address generator 1204. The data read out from the frame buffer can include red, blue and green (RGB) pixel values that are first converted from digital to analog by digital/analog converters 1207 and then used to control an amount of power delivered by red, green and blue laser driver amplifiers 1208, 1210 and 1212 to corresponding laser diodes 1214, 1216 and 1218. Each of laser diodes 1214, 1216 and 1218 is optically coupled to optical scanner 202.

Movement and control of optical scanner 202 begins with timing signal generator 1220, which helps to synchronize X'-axis and Y'-axis amplitude and phase control modules 1222 and 1224. X'-axis and Y'-axis amplitude and phase control modules 1222 and 1224 in turn cooperatively drive piezoelectric actuators 406. Capacitive sensing regions 510 provide optical fiber position information to X'-axis and Y'-axis amplitude and phase control modules 1222 and 1224 as described in the text accompanying FIG. 13. These sensor readings help to identify any discrepancies in timing between the scan pattern being executed by optical scanner 202 and timing provided by timing signal generator 1220. In this way, any undesired alterations in scan pattern can be controlled by feedback.

Alternatively or additionally, capacitive sensing regions 510 could be used to provide sensor readings of the instantaneous position of optical fiber 206 to the spiral scan address sequence generator 1204 in order to allow the spiral scan address generator 1204 to select the correct pixel values corresponding to the instantaneous position of optical fiber 206 from the frame buffer.

Figure 13:
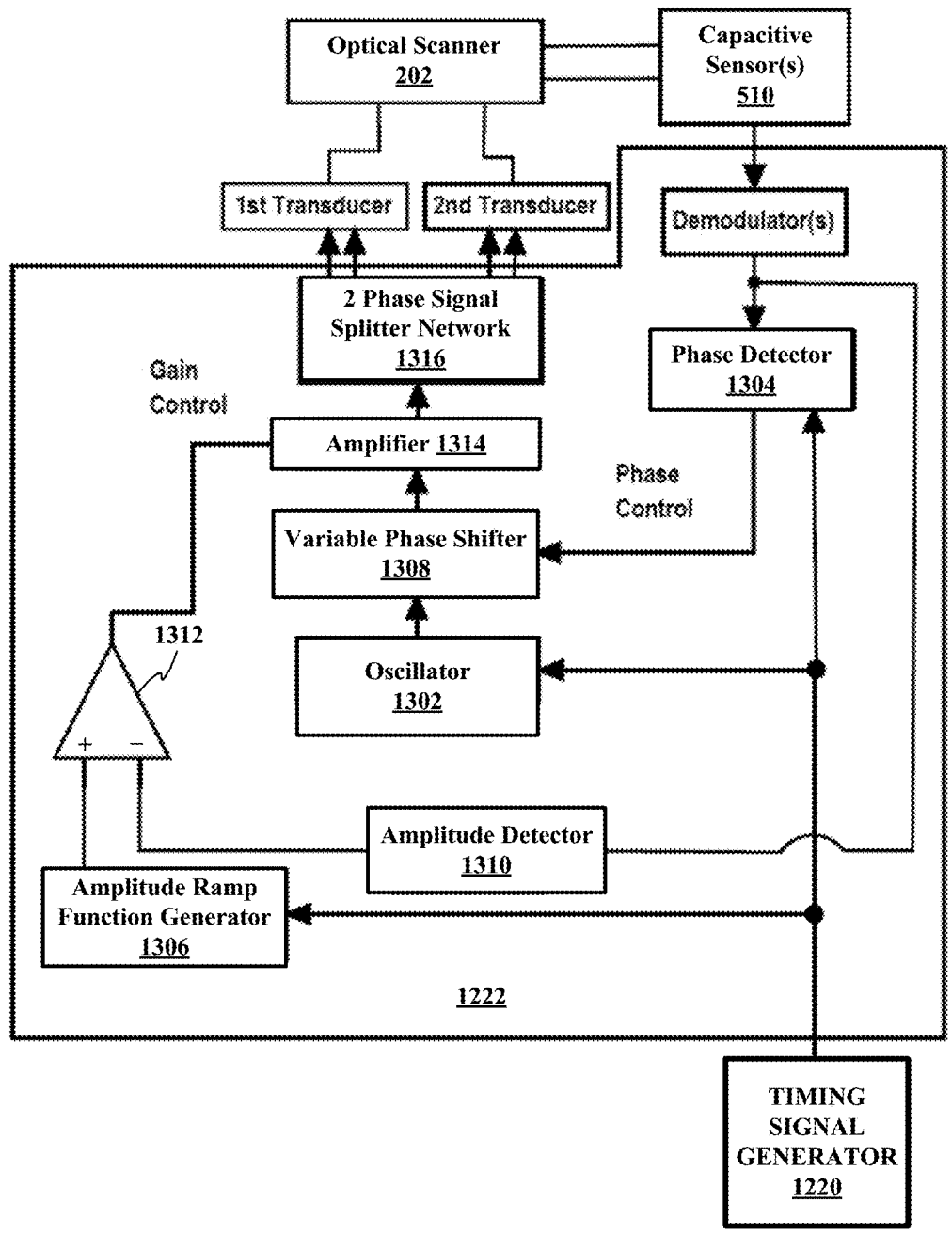
FIG. 13 shows a detailed view illustrating the operation of an X'-axis amplitude and phase control module according to an embodiment of the present invention.

FIG. 13 shows a detailed view illustrating the operation of X'-axis amplitude and phase control module 1222 according to an embodiment of the present invention. It should be appreciated that this description can also apply to Y'-axis amplitude and phase control module 1224. The signal generated by timing signal generator 1220 can be received by oscillator 1302, phase detector 1304 and amplitude ramp function generator 1306. Oscillator 1302 uses the timing signal received from timing signal generator 1220 to initiate and synchronize an oscillating signal input. For example, a sinusoidal input could be initiated and synchronized with the received timing signal. Alternatively, a chirped signal that has a frequency variation that takes into account nonlinearities of the restoring forces of the optical fiber 206. The result being that an oscillating input is generated and reliably synchronized with outputs from timing signal generator 1220. Phase detector 1304 is used to adjust the output of oscillator 1302 using data from capacitive sensing regions 510, which track actual movement of optical scanner 202. By comparing data from timing signal generator 1220 and demodulated data from capacitive sensing regions 510, phase detector 1304 is able to provide an offset value to variable phase shifter 1308, which can be utilized to shift the phase of the signal generated by optical scanner 202 so that an output of optical scanner 202 matches an input generated by timing signal generator 1220.

Similarly, demodulated sensor readings from capacitive sensing regions 510 can also be used to regulate an amplitude of a signal generated by oscillator 1302. Amplitude ramp function generator 1306 can be configured to modulate the amplitude signal to match a circular or spiral scan pattern. In the case of a spiral scan pattern the amplitude slowly increases and decreases over the duration of the scan. Amplitude detector 1310 receives the demodulated sensor readings detected by capacitive sensing regions 510, which are compared with an output from amplitude ramp function generator 1306 by differential amplifier 1312 in order to determine how much if at all the amount of movement of optical scanner 202 differs from a desired amplitude. Any difference between the signals is then applied to amplifier 1314, which can boost or attenuate the drive signal prior to it being received by a two-phase signal splitter network 1316. Two-phase signal splitter network 1316 distributes the signal to $1^{st}$ and $2^{nd}$ Transducers, which each include two piezoelectric actuators 406, in order to keep a light emitting component of optical scanner 202 in motion.

Figure 14A:
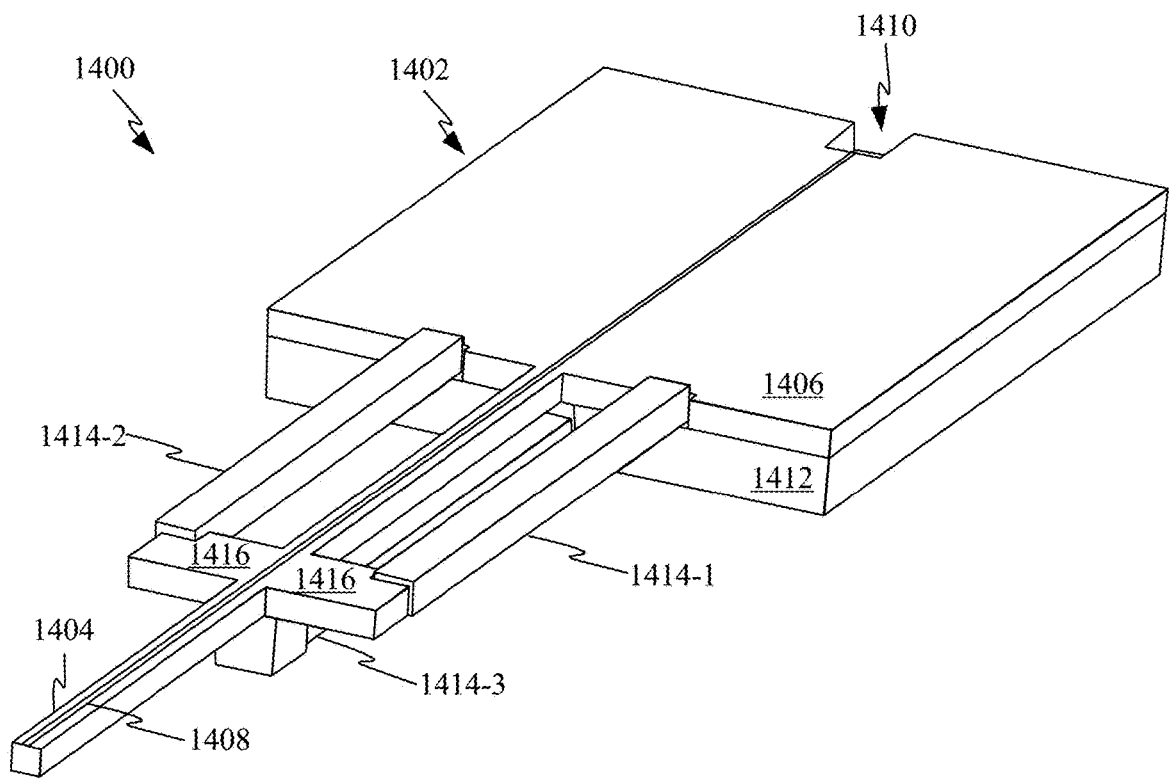
FIGS. 14A-14D show another type of MEMS scanner formed using a silicon on insulator wafer construction that includes a base region and cantilevered beam according to an embodiment of the present invention.

FIGS. 14A-14D show another type of MEMS scanner 1400 formed using a silicon on insulator wafer construction that includes a base or handle region 1402 and cantilevered beam 1404 according to an embodiment of the present invention. FIG. 14A shows how a portion of base region 1402 and cantilevered beam 1404 can be formed from a layer of monocrystalline silicon 1406, also referred to as a single crystal silicon layer. In some embodiments, the monocrystalline silicon portion of base region 1402 and cantilevered beam 1404 can be about 100 microns thick, thereby allowing for deflection of cantilevered beam 1404 during operation of MEMS scanner 1400. A waveguide 1408 can be formed along an upper surface of base region 1402 and cantilevered beam 1404. Cantilevered beam 1404 with waveguide 1408 can be referred to as a cantilevered optical member. In some embodiments light can be received by waveguide 1408 from a fiber optic cable engaging notch 1410 defined by base region 1402. Base region 1402 can be used to secure MEMS scanner 1400 to another structure.

Base region 1402 can also include a layer of silicon 1412 that is coupled to monocrystalline silicon layer 1406. In some embodiments, monocrystalline silicon layer 1406 can be bonded to silicon layer 1412 by a compression bonding operation resulting in the two layers being bonded via a silicon oxide layer. Silicon layer 1412 can be configured to provide structural support to base region 1402 and can be about 200 microns or twice as thick as monocrystalline silicon layer 1406, which can have a thickness of about 100 microns. In some embodiments, silicon layer 1412 can provide a mounting surface to which one or more actuation structures can be affixed. As depicted in FIG. 14A, the actuators can include three piezoelectric actuators 1414 configured to cooperatively maneuver cantilevered beam 1404 in a desired scan pattern. Each of actuators 1414-1 and 1414-2 can extend between a notch defined by monocrystalline layer 1406 and one of lateral protrusions 1416. Since piezoelectric actuators 1414-1 and 1414-2 lie substantially in the same plane as monocrystalline layer 1406, actuation of piezoelectric actuators 1414-1 and 1414-2 induce lateral movement of cantilevered beam 1404. A length of lateral protrusions 1416 helps to define how much movement is induced by piezoelectric actuators 1414-1 and 1414-2. It should be noted that in some embodiments, lateral protrusions 1416 can be substantially shorter where it is desirable for piezoelectric actuators to engage cantilevered beam 1404 closer to a central axis of cantilevered beam 1404. Alternatively, a cantilevered beam 1404 could be configured entirely without lateral protrusions 1416, where cantilevered beam 1404 is wide enough to accommodate attachment of piezoelectric actuators 1414-1 and 1414-2 to opposing sides or edges of cantilevered beam 1404.

Actuating piezoelectric actuators 1414-1 and 1414-2 can generate lateral movement of cantilevered beam 1404, while periodically actuating piezoelectric actuator 1414-3 can generate vertical movement of cantilevered beam 1404. In this way, actuators 1414 can generate a two-dimensional scan pattern. In some embodiments, the scan pattern can be a circular scan pattern. It should be noted that control of piezoelectric actuators 1414 can be controlled in accordance with the control methods described in conjunction with FIGS. 12-13. In some embodiments, strain gauge(s) positioned on or adjacent to cantilevered beam can be configured to track movement of cantilevered beam 1404 and can provide feedback for the previously described control methods.

Figure 14B:
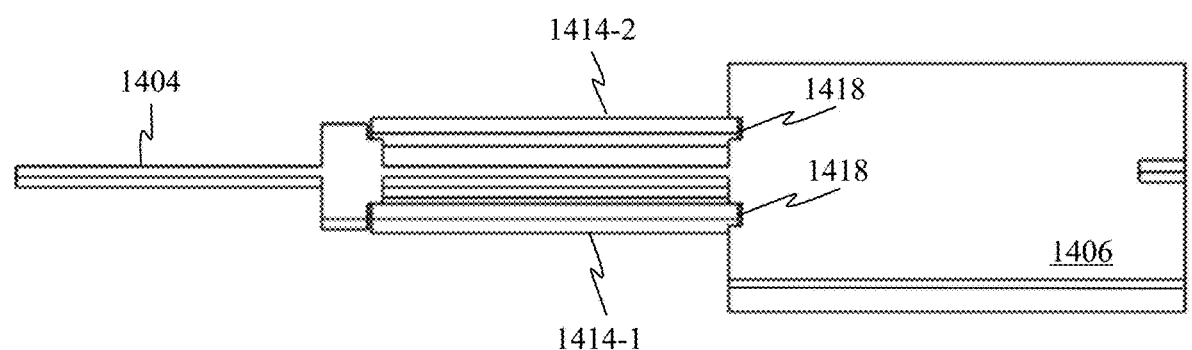

FIG. 14B shows a perspective side view of MEMS scanner 1400 according to an embodiment of the present invention. In particular, FIG. 14B more clearly shows a scale of cantilevered beam 1404 relative to base region 1402. FIG. 14B also shows an exemplary depth of notches 1418 formed in monocrystalline silicon layer 1406 that accommodate and provide a channel within which one end of piezoelectric actuators 1414-1 and 1414-2 can rest. A wall defining each of notches 1418 can also include an electrical interface configured to supply electrical signals to piezoelectric actuators 1414 for controlling piezoelectric actuators 1414-1 and 1414-2.

Figure 14C:
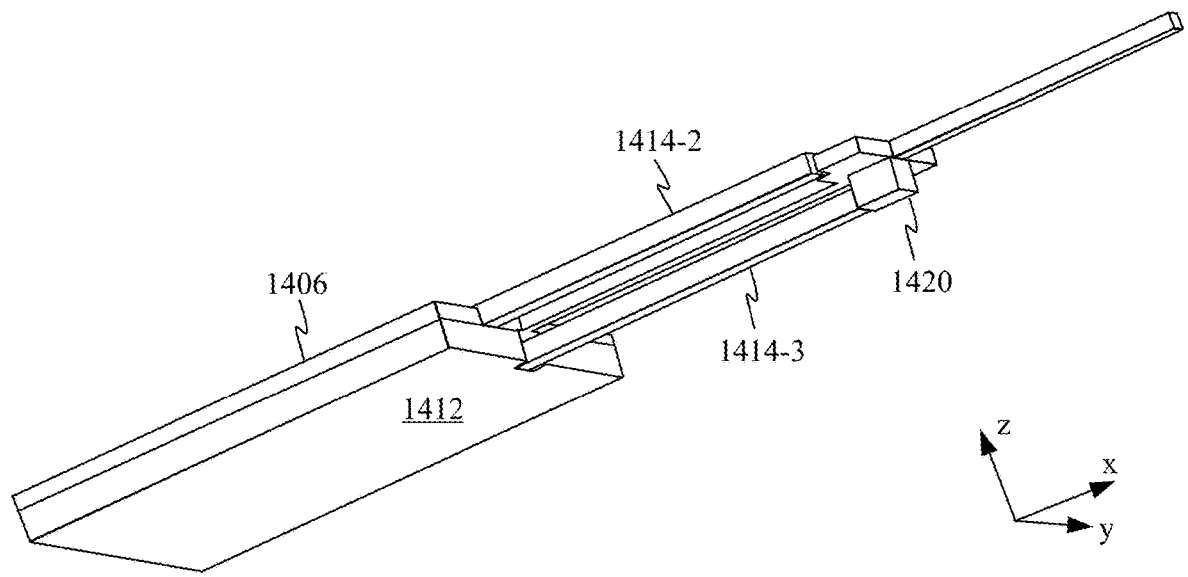

FIG. 14C shows a perspective view of a lower side of MEMS scanner 1400 according to an embodiment of the present invention. In particular, a clearer view of piezoelectric actuator 1414-3 is shown. A first end of piezoelectric actuator 1414-3 engages a notch defined in silicon layer 1412. In some embodiments, signals for driving piezoelectric actuator 1414-3 can be routed through silicon layer 1412 and/or monocrystalline silicon layer 1406. A second end of piezoelectric actuator 1414-3 engages a block of silicon 1420 protruding from a downward-facing surface of cantilevered beam 1404. When piezoelectric actuator 1414-3 expands and contracts, the resulting force on silicon block 1420 creates a lever arm that exerts a force on cantilevered beam 1404 resulting in rotation of cantilevered beam about the y-axis and vertical movement of light being emitted from waveguide 1408.

Figure 14D:
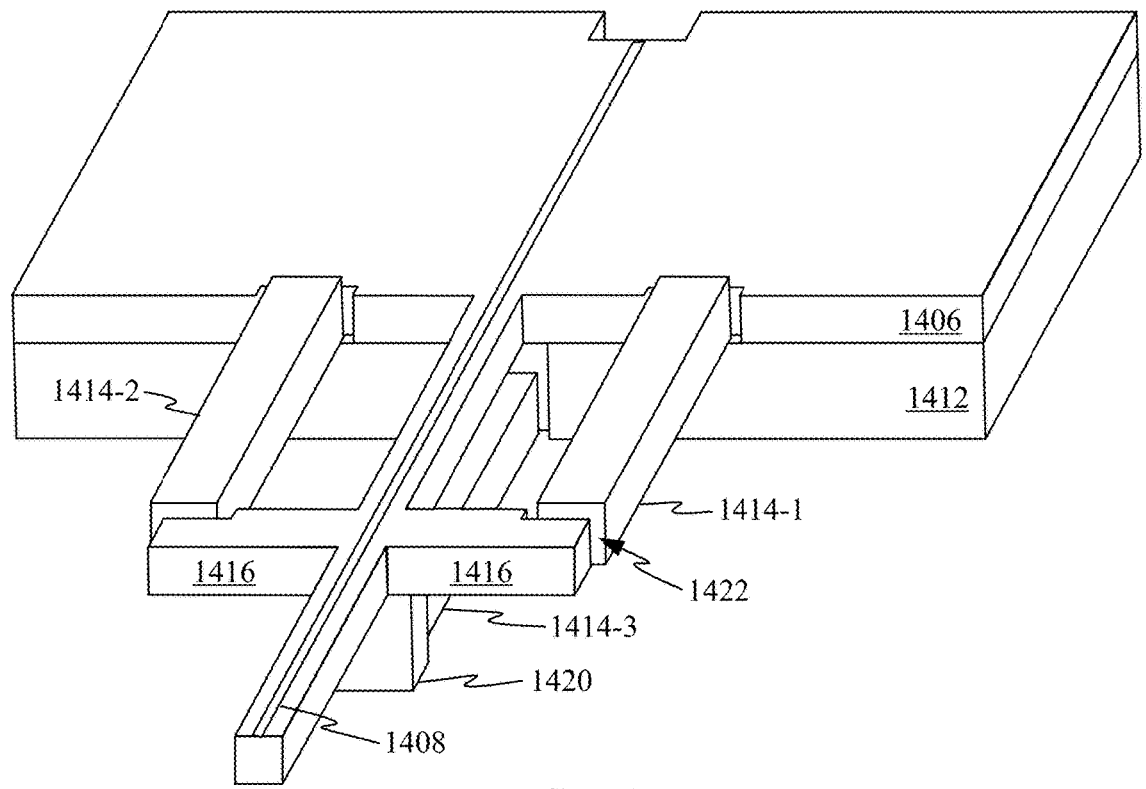

FIG. 14D shows a perspective view of an upper side of MEM scanner 1400 according to an embodiment of the present invention. Each one of protrusions 1416 of cantilevered beam 1404 includes a notch 1422 for accommodating one of piezoelectric actuators 1414. Notch 1422 can help in alignment of piezoelectric actuators 1414 with protrusions 1416. The depth of notch 1422 can be set to help accommodate a desired length of piezoelectric actuators 1414. FIG. 14D also shows how a height of the piezoelectric actuator can exceed the height of lateral protrusions 1416. For example, a height of piezoelectric actuator 1414 can be about 150 microns while the height of lateral protrusions 1416 can be about 100 microns. It should be appreciated that in some embodiments it can be desirable to use piezoelectric actuators having the same height as lateral protrusions 1416. In this way, proper alignment of piezoelectric actuators can be more easily achieved with lateral protrusions 1416.

Figure 15A:
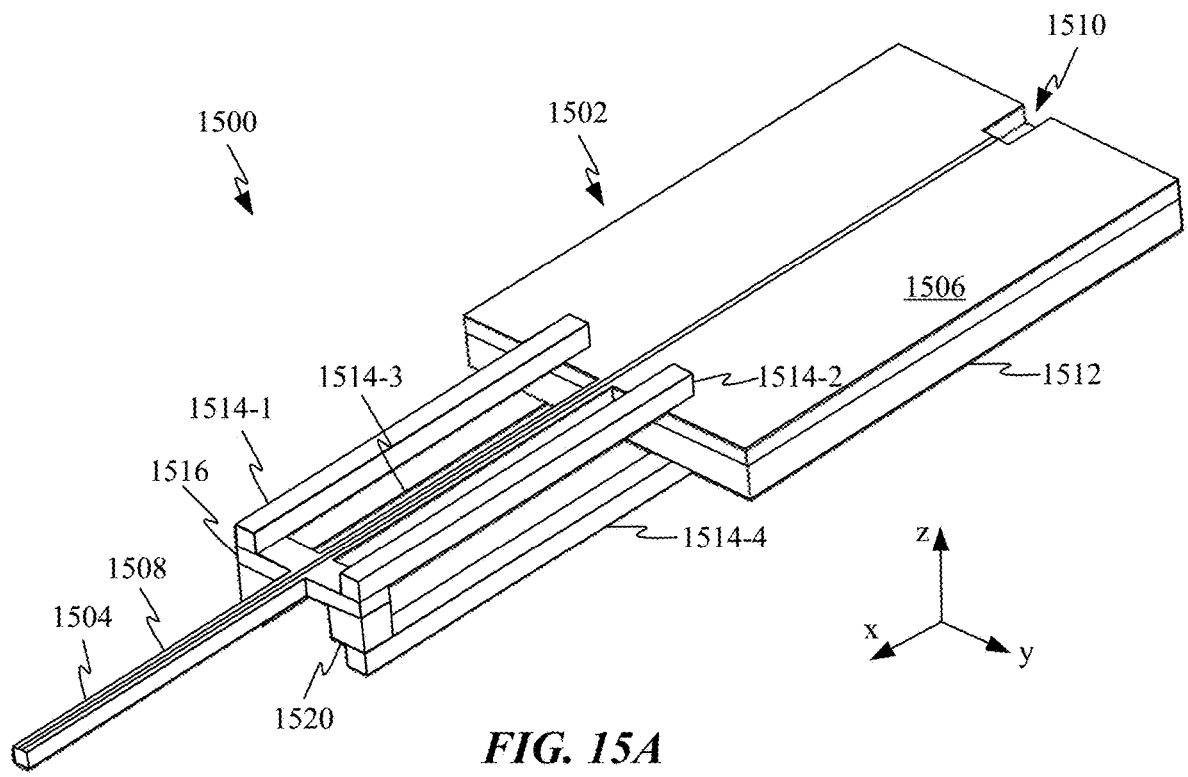
FIGS. 15A-15D show an alternative MEMS scanner embodiment utilizing four piezoelectric actuators to maneuver a cantilevered beam according to an embodiment of the present invention.
Figure 15B:
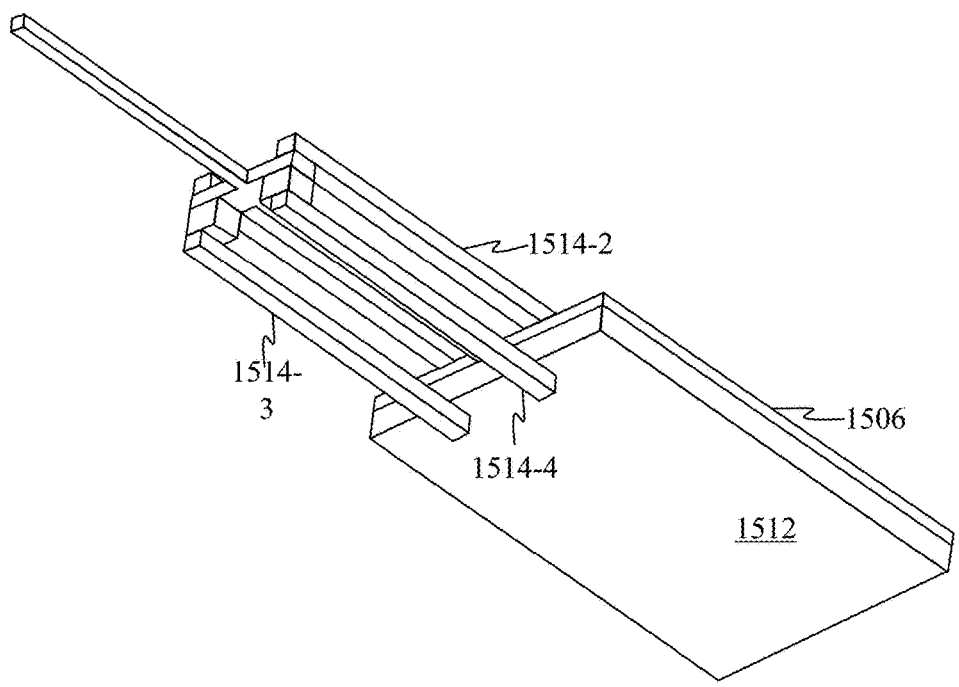
Figure 15C:
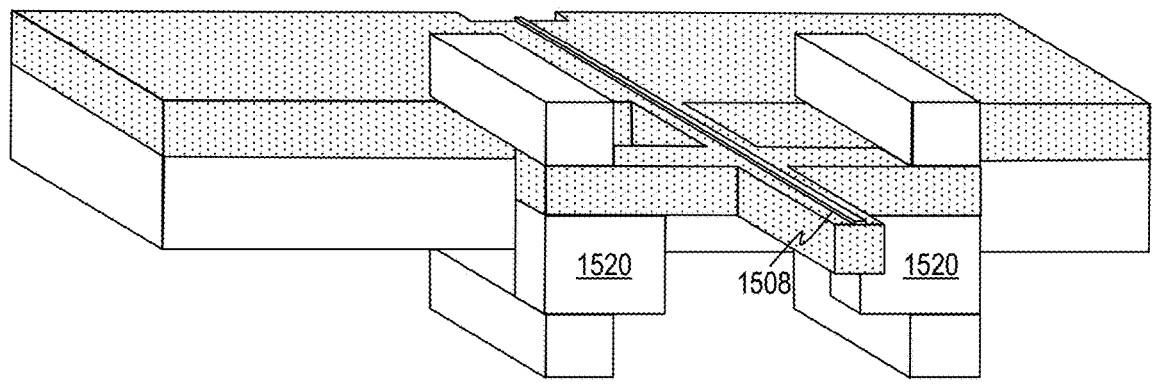

FIGS. 15A-15C show an alternative MEMS scanner embodiment utilizing four piezoelectric actuators to maneuver a cantilevered beam. MEMS scanner 1500 includes a base region 1502 and cantilevered beam 1504. FIG. 15A shows how a portion of base region 1502 and cantilevered beam 1504 can be formed from a layer of monocrystalline silicon 1506. In some embodiments, the monocrystalline silicon portion of base region 1402 and cantilevered beam 1404 can be about 100 microns thick, thereby allowing for deflection of cantilevered beam 1404 during operation of MEMS scanner 1500. A waveguide 1508 can be formed along an upper surface of base region 1502 and cantilevered beam 1504. In some embodiments, light can be received at waveguide 1508 from a fiber optic cable engaging notch 1510 defined by base region 1502.

FIG. 15A also shows how base region 1502 can also include a layer of silicon 1512 that is coupled to monocrystalline silicon layer 1506. In some embodiments, monocrystalline silicon layer 1506 can be bonded to silicon layer 1512 during a compression bonding operation resulting in the two layers being bonded by a silicon oxide layer. Silicon layer 1512 can be configured to provide structural support to base region 1502 and can be about 200 microns or twice as thick as monocrystalline silicon layer 1506, which can have a thickness of about 100 microns. In some embodiments, monocrystalline silicon layer 1506 can provide a mounting surface to which one or more actuation structures can be affixed. As depicted in FIG. 15A, the actuators can include piezoelectric actuators 1514-1-1514-4, which are configured to cooperatively maneuver cantilevered beam 1504 in a desired scan pattern. The distance over which lateral protrusions 1516 protrude from cantilevered beam 1504 helps to define how much rotation is induced by piezoelectric actuators 1514-1 and 1514-2. In this embodiment, piezoelectric actuators 1514-3 and 1514-4, which are mounted to a downward facing surface of base region 1502, can be positioned directly beneath respective piezoelectric actuators 1514-1 and 1514-2, which are mounted to an upward facing surface of base region 1502. In this way, an amount of lateral rotation about the z-axis of cantilevered beam 1504 can be substantially the same for any of piezoelectric actuators 1514. However, since piezoelectric actuators 1514-3 and 1514-4 are attached to cantilevered beam 1504 by way of silicon blocks 1520, thereby creating a different lever arm size, a length and/or operating characteristic of piezoelectric actuators 1514-3 and 1514-4 can be changed so that an amount of vertical rotation about the y-axis can be similar to or the same as the amount of rotation generated by piezoelectric actuators 1514-1 and 1514-2.

FIG. 15B shows a perspective view of a lower side of MEMS scanner 1500 according to an embodiment of the present invention. In particular, a clearer view of piezoelectric actuators 1514-3 and 1514-4 is shown. A first end of piezoelectric actuators 1514-3 and 1514-4 engage a downward facing surface of silicon layer 1512. In some embodiments, signals for driving piezoelectric actuator 1414-3 can be routed through silicon layer 1512 and/or monocrystalline silicon layer 1506. A second end of each of piezoelectric actuator 1514-3, 1514-4 engages a respective block of silicon 1520, which protrudes from a downward-facing surface of lateral protrusions 1516. In this embodiment, piezoelectric actuators 1514 each apply shearing forces to cantilevered beam 1504 imparted through a bond between piezoelectric actuators 1514, monocrystalline layer 1506, silicon layer 1512, lateral protrusions 1516, and silicon blocks 1520. When piezoelectric actuator 1414-3 expands and contracts, the resulting force on silicon block 1520 creates a lever arm that exerts a force on cantilevered beam 1504, resulting in rotation of cantilevered beam about the y-axis and vertical movement of light being emitted from waveguide 1508 as well as rotation of cantilevered beam 1504 about the z-axis and horizontal movement of light being emitted from waveguide 1508. By sequentially actuating piezoelectric actuators 1514 a circular scan pattern can be induced as is described above.

FIG. 15C shows a front perspective view of MEMS scanner 1500 according to an embodiment of the present invention. In particular, dimensions of waveguide 1508 are more clearly shown as waveguide 1508 protrudes slightly from an upper surface of cantilevered beam 1504. Furthermore, a rectangular configuration of piezoelectric actuators 1514-1-1514-4 results in a symmetric amount of lateral movement/rotation being provided by actuation of each of piezoelectric actuators 1514.

Figure 15D:
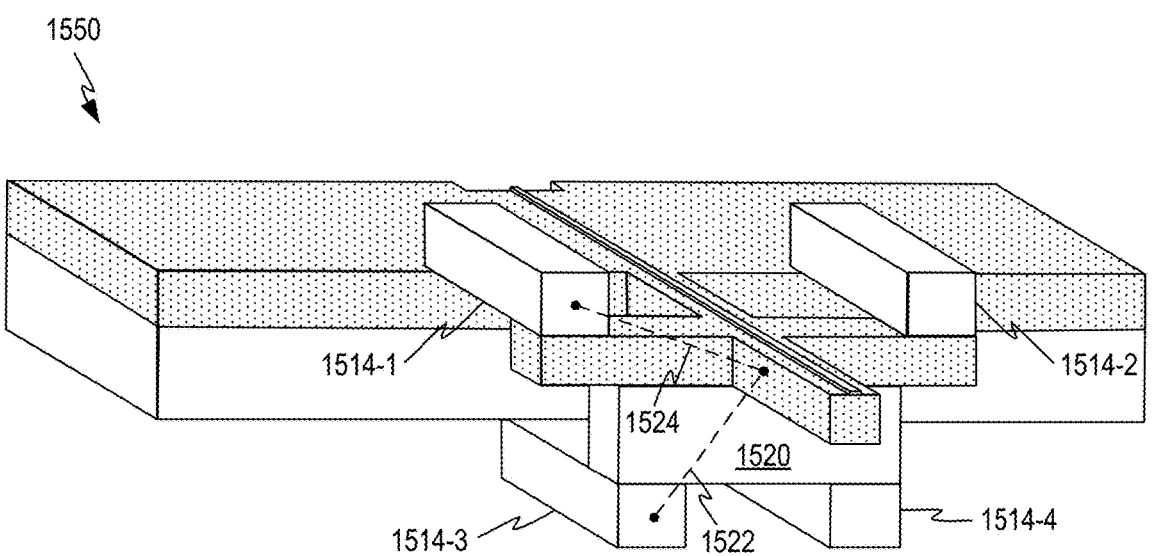

FIG. 15D shows a front perspective view of another MEMS scanner embodiment 1550 according to an embodiment of the present invention. In this embodiment, lower piezoelectric actuators 1514-3 and 1514-4 are positioned inboard of upper piezoelectric actuators 1514-1 and 1514-2. By positioning piezoelectric actuators 1514-3 and 1514-4 inboard of the upper piezoelectric actuators, an effective lever arm can be equalized, thereby reducing the likelihood of different modes of vibration. As depicted, lever arms 1522 and 1524 are substantially the same length. Piezoelectric actuators 1514-3 and 1514-4 are also coupled to a single silicon block 1520. Using a single block in lieu of two discrete silicon blocks can vary.

Figure 16A:
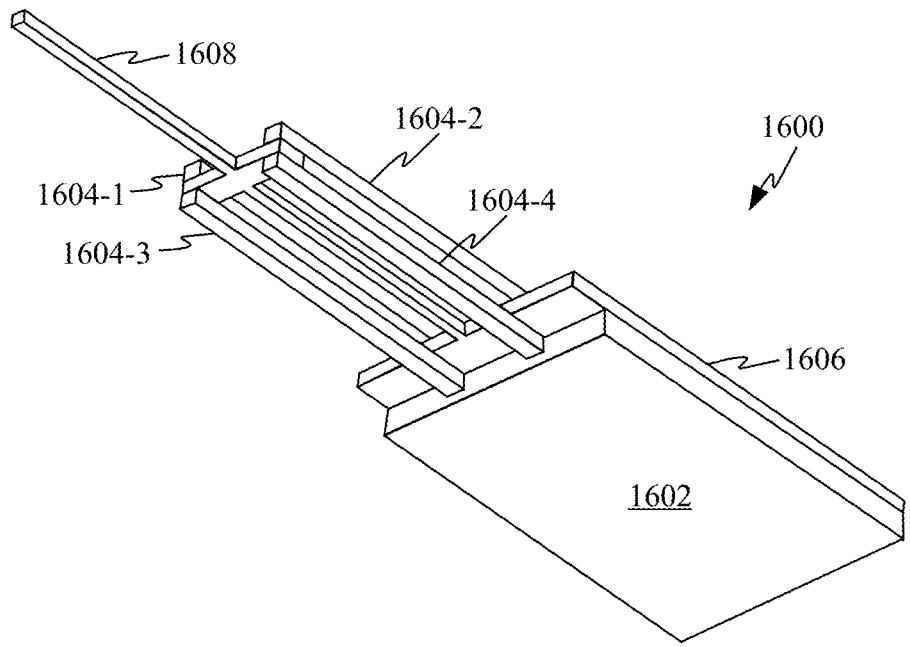
FIGS. 16A-16B show configurations in which a portion of a silicon layer has been removed to accommodate mounting of all piezoelectric actuators directly to a monocrystalline silicon layer according to an embodiment of the present invention.
Figure 16B:
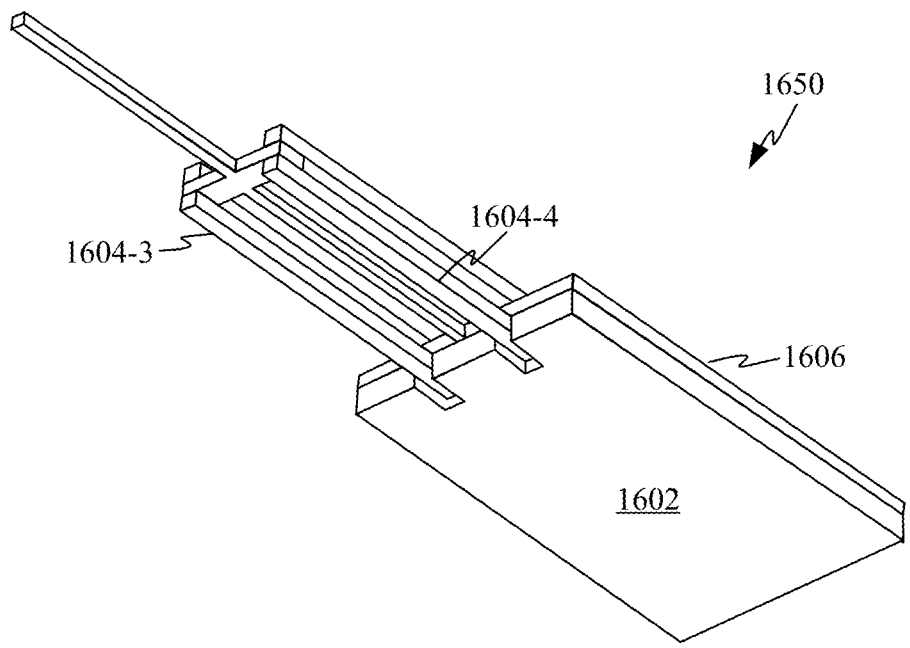

FIGS. 16A-16B show configurations in which a portion of a silicon layer has been removed to accommodate mounting of all piezoelectric actuators directly to a monocrystalline silicon layer according to an embodiment of the present invention. FIG. 16A shows how MEMS scanner 1600 can include a silicon layer 1602 that is offset from one edge of monocrystalline silicon layer 1606 to expose a portion of a downward facing surface of monocrystalline silicon layer 1606. In this way, all of piezoelectric actuators 1604 can be vertically offset the same distance above or below cantilevered beam 1608. FIG. 16B shows a similar MEMS scanner 1650 design where only notched portions of silicon layer 1602 are removed to accommodate the ends of piezoelectric actuators 1604-3 and 1604-4.

Figure 17:
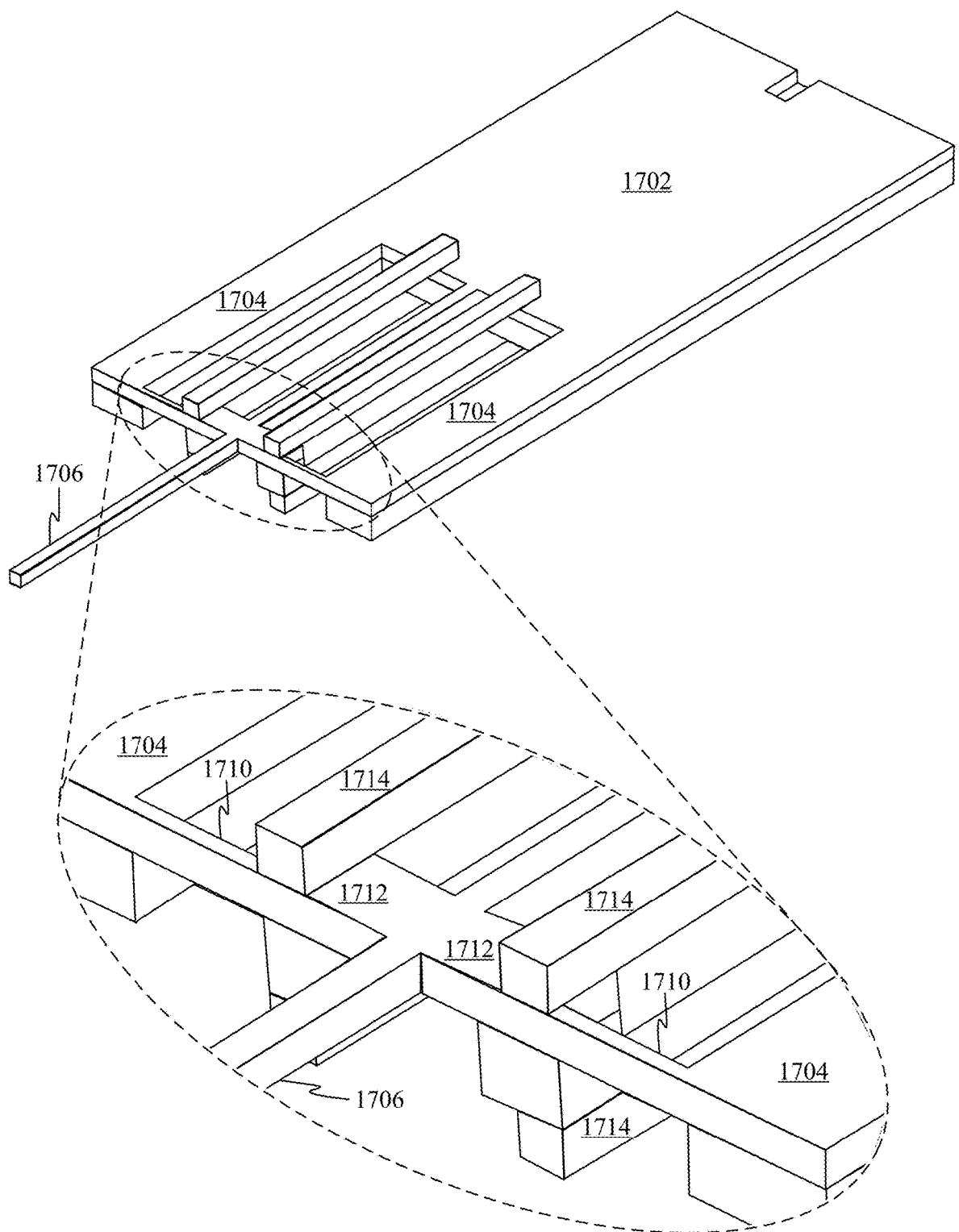
FIG. 17 shows a perspective view of another MEMS scanner according to an embodiment of the present invention.

FIG. 17 shows a perspective view of another MEMS scanner 1700 according to an embodiment of the present invention. Monocrystalline silicon layer 1702 includes two protrusions 1704 in addition to cantilevered beam 1706. Protrusions 1704 are coupled to lateral protrusions 1708 by flexures 1710. Flexures 1710 can be designed to attenuate vertical and lateral deflection of cantilevered beam 1706. Flexures 1710 can help limit movement of a portion of cantilevered beam 1706 that includes lateral protrusions 1712 during actuation of piezoelectric actuators 1714. By limiting the movement of the portion of cantilevered beam 1706 in this way, an effective length of the cantilevered beam can be substantially reduced. In some embodiments, an overall length of cantilevered beam 1706 can be about 2 mm while the portion of cantilevered beam 1706 extending past lateral protrusions 1712 can be about 1 mm.

Figure 18A:
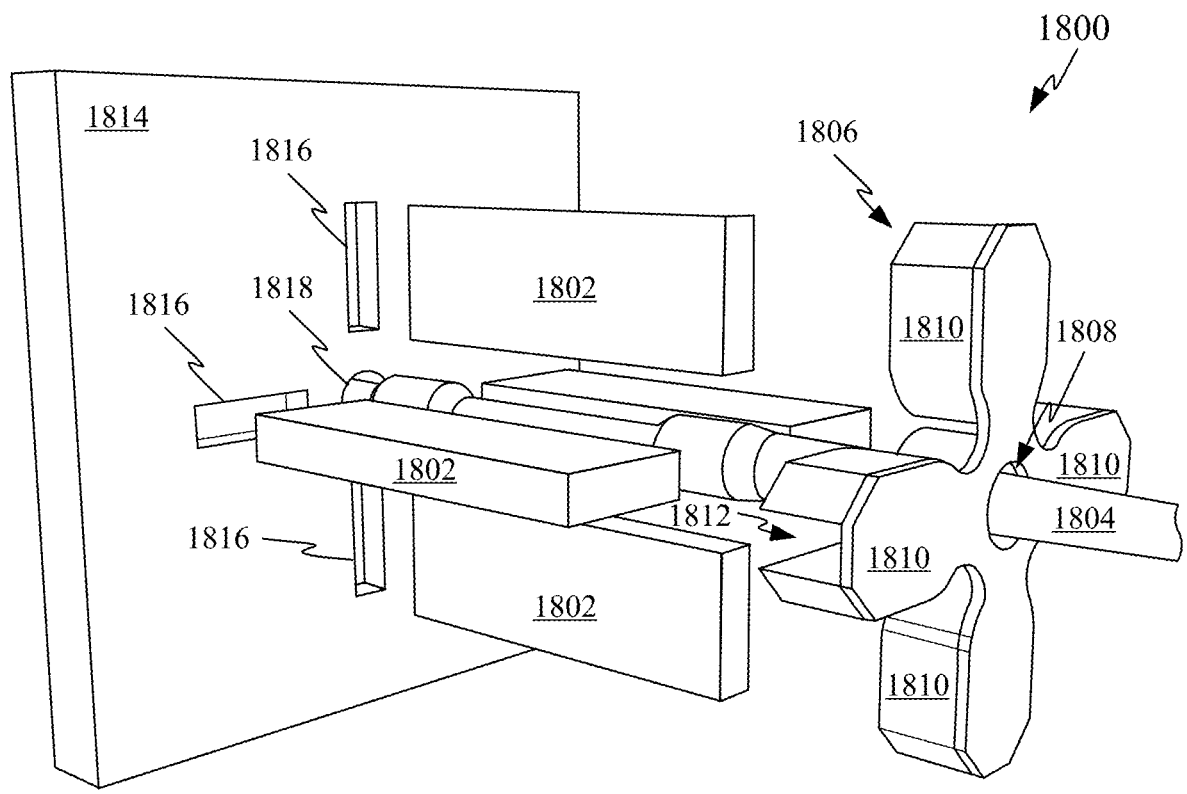
FIGS. 18A-18B show perspective views of an optical scanner having a cantilevered member that takes the form of an optical fiber according to an embodiment of the present invention.
Figure 18B:
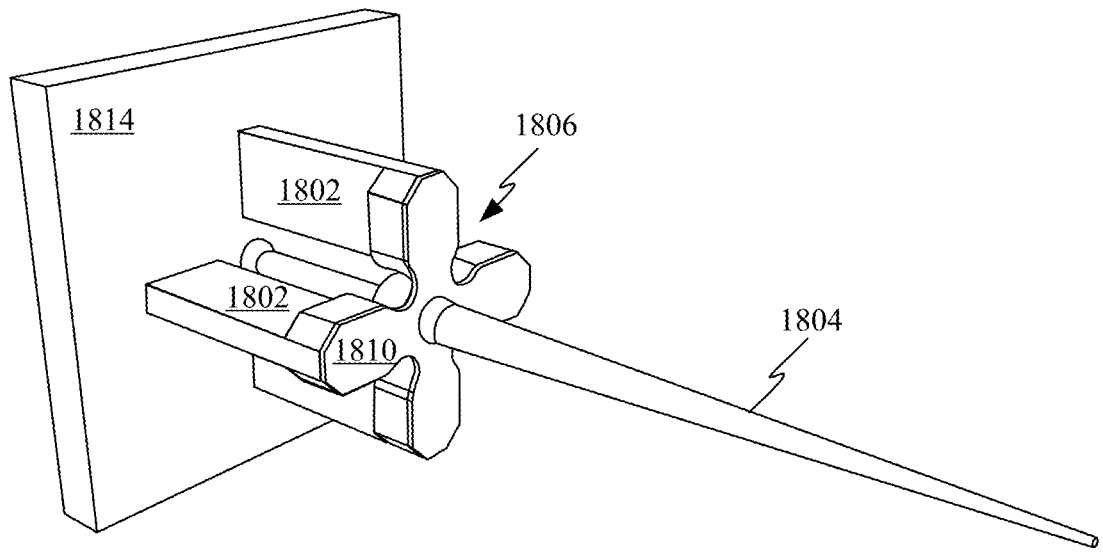

FIGS. 18A-18B show perspective views of an optical scanner using a cantilevered member taking the form of an optical fiber according to an embodiment of the present invention. In particular, FIG. 18A shows an exploded perspective view of parts making up optical scanner 1800. In particular, four piezoelectric actuators 1802 taking the form of piezoelectric columns are configured to actuate optical fiber 1804 by exerting force upon hub structure 1806. Hub structure 1806 defines a central opening 1808 sized to receive optical fiber 1804 and four lateral protrusions 1810 for receiving and securing piezoelectric actuators 1802 to optical fiber 1804. Each of lateral protrusions 1810 can include a notch 1812 for receiving a first end of each of piezoelectric actuators 1802. A base portion or supporting structure 1814 includes recesses 1816 for receiving a second end of each of piezoelectric actuators 1802 and a central opening 1818 through which optical fiber 1804 extends. Supporting structure 1814 can take the form of a silicon substrate that includes electrically conductive traces for carrying signals to piezoelectric actuators 1802.

FIG. 18B shows a perspective view of optical scanner 1800 fully assembled according to an embodiment of the present invention. Similar to previous embodiments, piezoelectric actuators 1802 can be configured to sequentially actuate to maneuver a cantilevered member, which in this embodiment takes the form of optical fiber 1804, in a scan pattern similar to the scan pattern depicted in FIG. 9. An interference fit between optical scanner 1804 and material defining opening 1808 of hub structure 1806 allows for movement and rotation of optical fiber 1804 when lateral protrusions 1810 of hub structure 1806 are acted upon by piezoelectric actuators 1802. In some embodiments, piezoelectric actuators can be adhesively coupled to hub structure 1806 and supporting structure 1814. While four lateral protrusions 1810 are depicted, it should be appreciated that a different number of piezoelectric actuators and corresponding lateral protrusions is also possible. For example, three, five or six piezoelectric actuators could be utilized to generate a desired scan pattern. It should also be appreciated that the piezoelectric actuators could be rotated in any desired orientation such as an X or any other similar pattern.

Figure 19A:
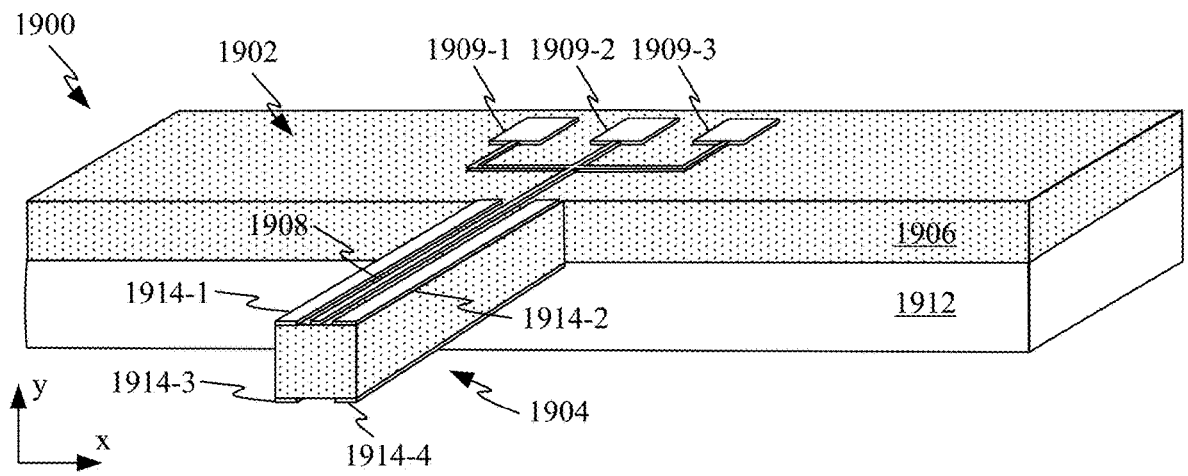
FIGS. 19A-19C show various embodiments in which discrete piezoelectric film actuators are used to induce movement of a cantilevered beam of a MEMS scanner 1900 in a scan pattern.
Figure 19B:
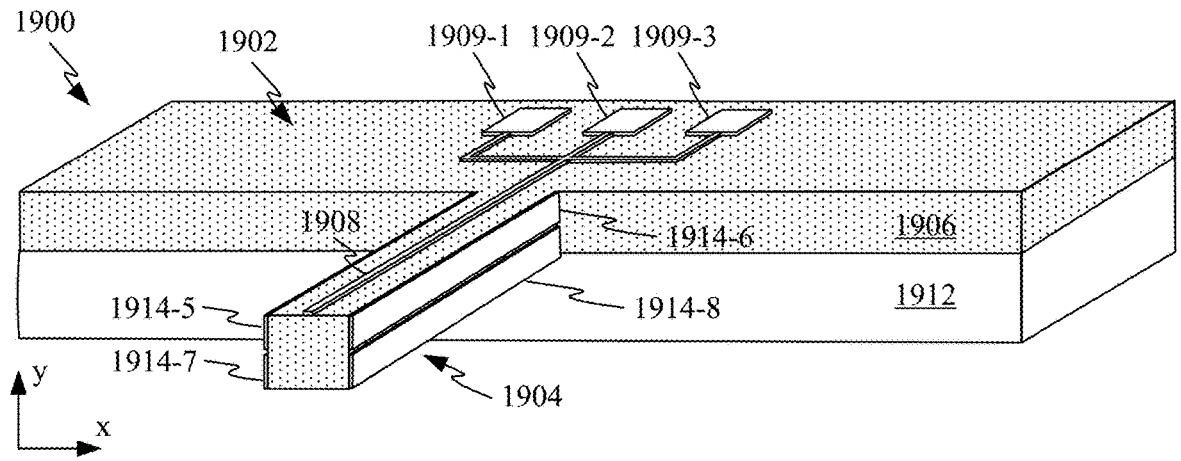
Figure 19C:
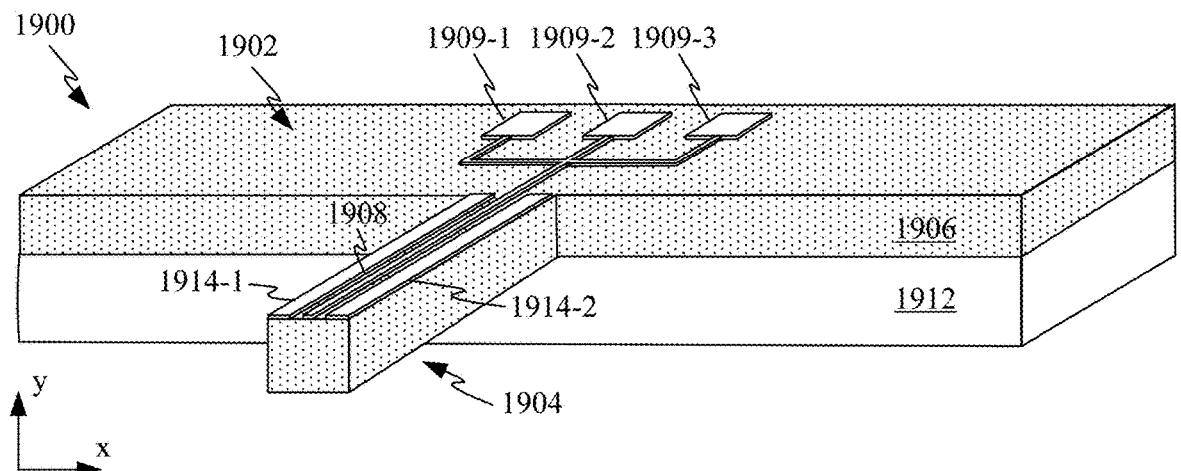

FIGS. 19A-19C show various embodiments in which discrete piezoelectric film actuators are used to induce movement of a cantilevered beam of a MEMS scanner 1900 in a scan pattern according to an embodiment of the present invention. MEMS scanner 1900 can be formed using a silicon on insulator wafer construction that includes a base region 1902 and cantilevered beam 1904. FIG. 19A shows how a portion of base region 1902 and cantilevered beam 1904 can be formed from a layer of monocrystalline silicon 1906. In some embodiments, the monocrystalline silicon portion of base region 1902 and cantilevered beam 1904 can be about 100 microns thick, thereby allowing for deflection of cantilevered beam 1904 during operation of MEMS scanner 1900. A waveguide 1908 can be formed along an upper surface of base region 1902 and cantilevered beam 1904. In some embodiments light can be received by waveguide 1908 from laser diodes 1909-1, 1909-2 and 1909-3, which are secured to a surface of monocrystalline silicon 1906. In some embodiments, laser diodes 1909-1 can be a red laser diode, laser diode 1909-2 can be a blue laser diode, and laser diode 1909-3 can be a green laser diode. In some embodiments additional laser diodes could be added to allow for a larger variety of colors to be produced and propagated through waveguide 1908 by mixing light generated by two or more of laser diodes 1909. Base region 1902 can be affixed to a support structure along the lines of mechanical support structure 204 in FIG. 2 to secure MEMS scanner 1900 in place and to align a distal end of cantilevered beam with additional optics for propagating the light released from the distal end of waveguide 1908.

Base region 1902 can also include a layer of silicon 1912 that is coupled to monocrystalline silicon layer 1906. In some embodiments, monocrystalline silicon layer 1906 can be bonded to silicon layer 1912 by a compression bonding operation resulting in the two layers being bonded by a silicon oxide layer. Silicon layer 1912 can be configured to provide structural support to base region 1902 and can be about 200 microns or twice as thick as monocrystalline silicon layer 1906, which can have a thickness of about 100 microns. In some embodiments, silicon layer 1912 can provide a mounting surface to which one or more actuation structures can be affixed.

FIG. 19A also depicts four piezoelectric film actuators 1914 configured to cooperatively maneuver cantilevered beam 1904 in a desired scan pattern. Each of actuators 1914-1 and 1914-2 can be actuated in the same or different directions to impart different forces upon cantilevered beam 1904. Since piezoelectric film actuators 1914-1 and 1914-2 lie substantially in the same plane, an input that causes both of piezoelectric actuators 1914-1 and 1914-2 to expand longitudinally would induce movement of cantilevered beam 1904 downward, in the −y direction, whereas an input causing piezoelectric film actuators 1914-1 and 1914-2 to contract longitudinally would induce movement of cantilevered beam 1904 upward in the +y direction. Concurrent actuation of all four of piezoelectric film actuators 1914 could increase the amount of force being exerted upon cantilevered beam 1904. For example, sending a contraction signal to piezoelectric film actuators 1914-1 and 1914-2 and an expansion signal to piezoelectric film actuators 1914-3 and 1914-4 would induce movement of cantilevered beam 1904 upward, in the +y direction. Sending an expansion signal to piezoelectric film actuators 1914-1 and 1914-3 and a contraction signal to piezoelectric film actuators 1914-2 and 1914-4 would induce lateral movement of cantilevered beam 1904 in the +x direction while reversing those signals would induce movement of cantilevered beam 1904 laterally in the −x direction.

FIG. 19B shows an alternative configuration for MEMS scanner 1900 in which piezoelectric film actuators 1914-5, 1914-6, 1914-7 and 1914-8 are arranged on lateral surfaces of cantilevered beam 1904. This configuration has the benefit of placing piezoelectric film actuators 1914-5-1914-8 on a different surface from waveguide 1908, thereby allowing for piezoelectric actuators 1914 to occupy a larger area of cantilevered beam 1904. Contraction and expansion inputs can be adjusted to achieve movement of cantilevered beam 1904 in the +x, −x, +y and −y directions. For example, by sending a contraction signal to piezoelectric actuators 1914-5 and 1914-6 and an expansion signal to piezoelectric film actuators 1914-7 and 1914-8 movement of cantilevered beam in the +y direction can be achieved. By applying differential signals to piezoelectric actuators 1914 a circular scan pattern of cantilevered beam 1904 can be established. Vertical and horizontal patterns are also possible where a line scan pattern is desired.

FIG. 19C shows another alternative configuration of MEMS scanner 1900 in which piezoelectric film actuators 1914-1 and 1914-2 are positioned on an upward facing surface of cantilevered beam 1904. Piezoelectric film actuators 1914-1 and 1914-2 can maneuver cantilevered beam 1904 in +x, −x, −y and +y directions and consequently are able to drive cantilevered beam 1904 in single axis or circular scan patterns as discussed above. For example, supplying a contraction signal/input to piezoelectric film actuator 1914-1 and an expansion signal/input to piezoelectric film actuator 1914-2 moves cantilevered beam 1904 laterally in the +x direction.

It should be noted that piezoelectric actuators 1914 can be controlled in accordance with the control methods described in conjunction with FIGS. 12-13. In some embodiments, strain gauge(s) positioned on or adjacent to cantilevered beam 1904 can be configured to track movement of cantilevered beam 1904 and can provide feedback for the previously described control methods.

FIGS. 20A-20B show perspective views of an optical scanner having a tapered cantilevered member according to an embodiment of the present invention. FIGS. 20A-20B illustrate two perspective views of an optical scanner 2000 from two slightly different viewing angles. As shown in FIGS. 20A-20B, optical scanner 2000 is similar to optical scanner 1900 of FIGS. 19A-19C. One notable difference is that optical scanner 2000 has a tapered cantilevered member, also referred to as a cantilevered beam. It should be noted that the tapered architecture illustrated in FIG. 20A is applicable to the other cantilevered beams discussed throughout this specification and illustrated in the drawings. Thus, although some embodiments of the present invention are illustrating using rectangular or parallelepiped geometrical structures, modification of these structures to incorporate one or more tapered cantilevered beams is included within the scope of the present invention. Therefore, it will be appreciated that the tapered cantilever architecture illustrated in FIG. 20A is applicable to a variety of the other cantilever architectures discussed herein.

In some embodiments, optical scanner 2000 can be formed using silicon-based MEMS technology, for example, in a silicon-on-insulator substrate. As shown in FIGS. 20A-20B, optical scanner 2000 includes a base region 2002, which can include a first silicon layer 2006 and a second silicon layer 2012. In some embodiments, the first silicon layer 2006 can be a single crystalline silicon layer. Optical scanner 2000 also includes a cantilevered beam 2004 formed in an extended portion of the first silicon layer 2006. In some embodiments, the monocrystalline silicon portion of base region 2002 and cantilevered beam 2004 can be about 100 microns thick, thereby allowing for deflection of cantilevered beam 2004 during operation of MEMS optical scanner 2000. A waveguide (not shown in FIGS. 20A-20B, but similar to waveguide 1908 in FIGS. 19A-19C) can be formed along an upper surface of base region 2002 and cantilevered beam 2004. The cantilevered beam 2004 and the associated waveguide can be referred to as a cantilevered optical member. In some embodiments, light can be received by the waveguide from laser diodes 2009-1, 2009-2 and 2009-3, which are secured to a surface of monocrystalline silicon 2006. In some embodiments, laser diodes 2009-1 can be a red laser diode, laser diode 2009-2 can be a blue laser diode, and laser diode 2009-3 can be a green laser diode. In some embodiments, additional laser diodes could be added to allow for a larger variety of colors to be produced and propagated through the waveguide by mixing light generated by two or more of laser diodes 2009. Base region 2002 can be affixed to a support structure along the lines of mechanical support structure 204 in FIG. 2 to secure optical scanner 2000 in place and to align a distal end of the cantilevered beam with additional optics for propagating the light released from the distal end of the waveguide.

The second layer of silicon 2012 of base region 2002 can be coupled to the first silicon layer 2006. In some embodiments, the first silicon layer 2006 can be bonded to the second silicon layer 2012 by a compression bonding operation resulting in the two layers being bonded by a silicon oxide layer. The second silicon layer 2012 can be configured to provide structural support to base region 2002 and can be about 200 microns or twice as thick as monocrystalline silicon layer 2006, which can have a thickness of about 100 microns. In some embodiments, the second silicon layer 2012 can provide a mounting surface to which one or more actuation structures can be affixed.

Optical scanner 2000 can also have a transducer assembly including one or more piezoelectric film actuators configured to cooperatively maneuver cantilevered beam 2004 in a desired scan pattern. As shown in FIGS. 20A-20B, piezoelectric film actuator 2014 lies substantially in a top plane of cantilevered beam 2004, a voltage input that causes piezoelectric actuator 2014 to expand longitudinally would induce movement of cantilevered beam 2004 downward, in the −y direction, whereas a voltage input causing piezoelectric film actuator 2014 to contract longitudinally would induce movement of cantilevered beam 2004 upward in the +y direction. Therefore, cantilevered beam 2004 is configured to scan in a vertical direction, as shown in FIG. 20A in the −y direction and the +y direction. In some embodiments, a second piezoelectric film actuator can be formed on a bottom surface of cantilevered beam 2004 to enhance the scanning motion.

As shown in FIGS. 20A-20B, cantilevered beam 2004 has a tapered shape or a triangular shape, with a proximal end 2021 adjacent to the base portion 2002 and a distal end 2022 at a tip region of the cantilevered beam 2004. In the taper or triangular cantilevered beam 2004, the distal end 2022 is narrower than the proximal end 2021. In some embodiments, the size of distal end 2022 can be selected according to the cross-sectional dimension of the waveguide. In some embodiments, cantilevered beam 2004 can have a length from 1000-4000 microns, a base width between 300-1000 um, and a thickness between 50-150 um. An advantage of the tapered cantilevered beam is that the narrower tip region enables the cantilevered beam to have a greater deflection at a given frequency over a non-tapered cantilever.

Figure 21A:
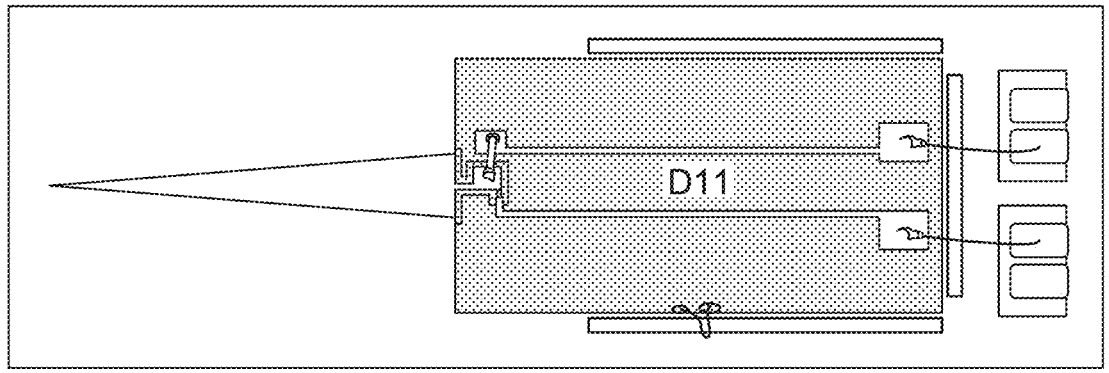
FIGS. 21A-21B show two top views of an optical scanner having a tapered cantilevered member according to an embodiment of the present invention.
Figure 21B:
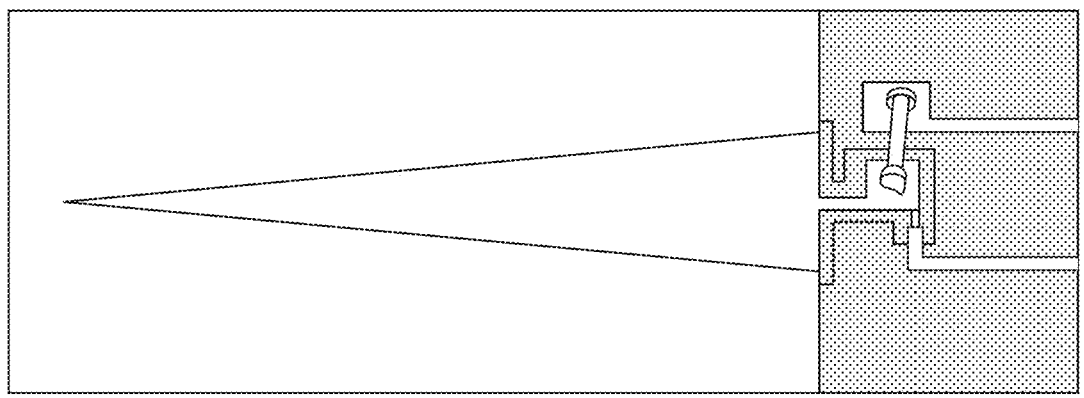
Figure 21C:
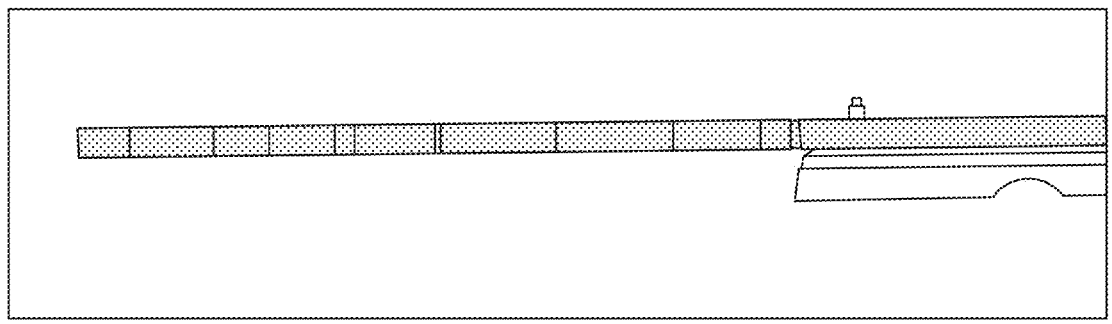
FIG. 21C shows a cross-sectional view of an optical scanner having a tapered cantilevered member according to an embodiment of the present invention.

FIGS. 21A-21B show two top views of an optical scanner having a tapered cantilevered member according to an embodiment of the present invention. FIG. 21C shows a cross-sectional view of an optical scanner having a tapered cantilevered member according to an embodiment of the present invention.

Figure 21D:
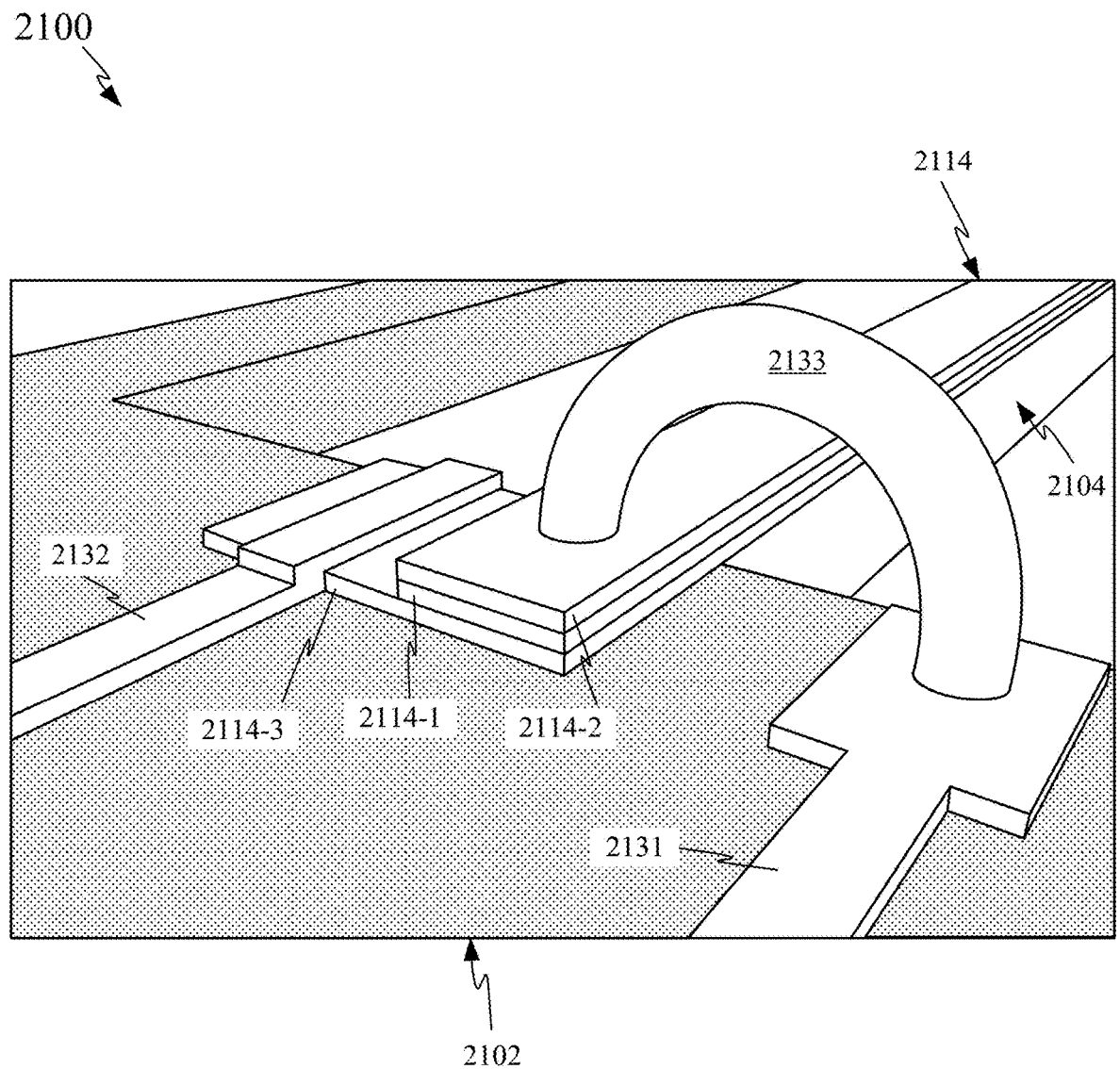
FIG. 21D shows a perspective view of an optical scanner having a tapered cantilevered member according to an embodiment of the present invention.

FIG. 21D shows a perspective view of a portion an optical scanner having a tapered cantilevered member according to an embodiment of the present invention. As shown in FIG. 21D, a portion of optical scanner 2100 includes a base region 2102 and a cantilevered beam 2104. Optical scanner 2100 also includes a piezoelectric film actuator 2114 disposed substantially in a top plane of cantilevered beam 2104.

Piezoelectric film actuator 2114 includes a piezoelectric layer 2114-1 sandwiched between a top electrode 2114-2 and a bottom electrode 2114-3. In some embodiments, piezoelectric layer 2114-1 can be a PZT (lead zirconate titanate) layer, top electrode 2114-2 can be a gold layer, and bottom electrode 2114-3 can be a platinum layer or a conductive metal oxide, such as $SrRuO_3$. Further, a first conductive connector 2131 is connected to the top electrode 2114-2 through a wire bond 2133, and a second conductive connector 2132 is connected to the bottom electrode 2114-3. Depending on the voltage applied between the top electrode and the bottom electrode, cantilevered beam 2104 can be made to deflect upward or downward, and to scan in a vertical direction.

Figure 22:
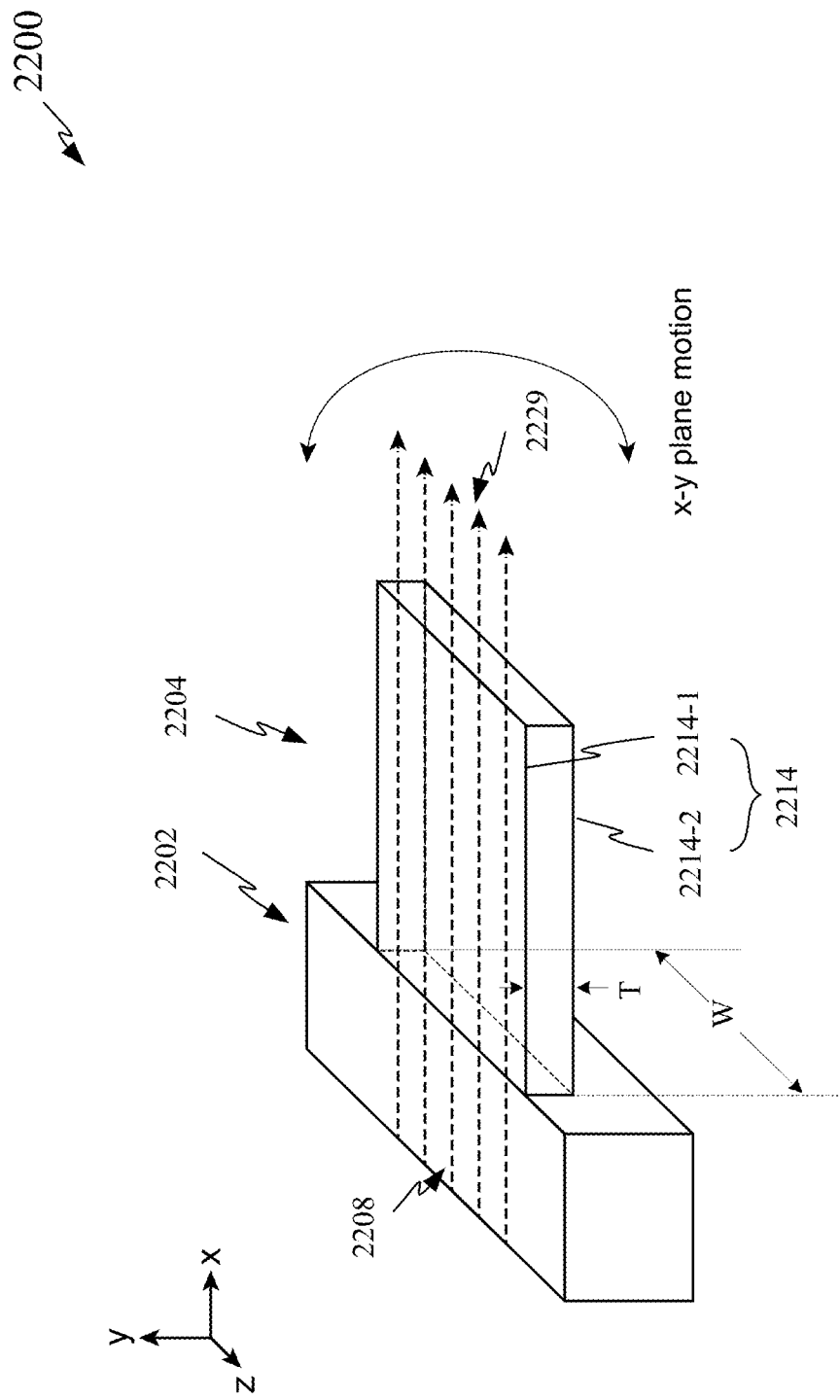
FIG. 22 shows a perspective view of an optical scanner having a wide cantilevered member according to an embodiment of the present invention.

FIG. 22 shows a perspective view of an optical scanner having a wide cantilevered member according to an embodiment of the present invention. As shown in FIG. 22, optical scanner 2200 is similar to the optical scanners described above in connection to FIGS. 19A-19C, 20A-20B, and 21A-21D. One notable difference is that optical scanner 2200 has a cantilevered member, or cantilevered beam, having an elongated width that can accommodate multiple waveguides. The cantilevered beam can also be referred to as a multi-waveguide cantilevered beam.

As shown in FIG. 22, optical scanner 2200 includes a base region 2202 and a cantilevered beam 2204. Optical scanner 2200 also includes a transducer assembly 2214 that can include one or more piezoelectric film actuators. In FIG. 22, a first piezoelectric film actuator 2214-1 is disposed substantially in a top plane of cantilevered beam 2204, and a second piezoelectric film actuator 2214-2 is disposed substantially in a bottom plane of cantilevered beam 2204. With proper bias voltages, piezoelectric film actuators 2214 enables cantilevered beam 2204 to deflect or scan in the x-y plane to form a one-dimensional optical scanner.

As shown in FIG. 22, cantilevered beam 2204 has a thickness T and an elongated width W. In some embodiments, the width W is greater than the thickness T. Cantilevered beam 2204 is configured to carry multiple waveguides 2208 and to provide a one-dimensional scan of multiple output beams 2229. The cantilevered beam 2204 and the associated waveguides 2208 can be referred to as a cantilevered optical member. The thickness T and width W can be selected to accommodate the number of waveguides needed for a particular application. For example, cantilevered beam 2204 can be configured to support 2-1,000 waveguides In some embodiments, cantilevered beam 2204 can have a thickness between 5-50 microns and a width between 300-3,000 microns.

Figure 23:
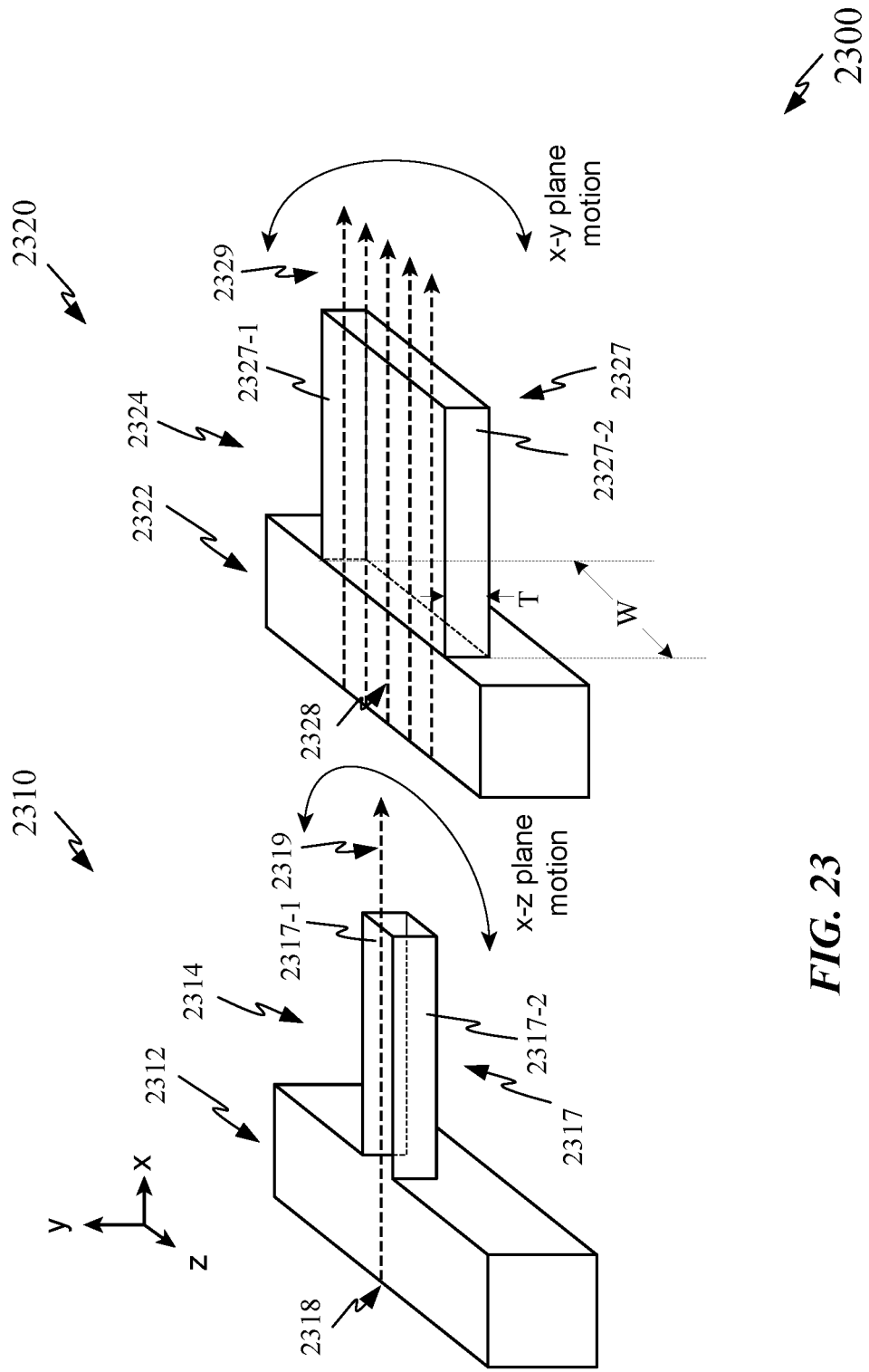
FIG. 23 shows a perspective view of two serially coupled optical scanners having cantilevered members according to an embodiment of the present invention.

FIG. 23 shows a perspective view of two serially coupled optical scanners having cantilevered members according to an embodiment of the present invention. As shown in FIG. 23, optical scanner 2300 includes a first optical scanner 2310 and a second optical scanner 2320. Both first optical scanner 2310 and second optical scanner 2320 are one-dimensional optical scanners, and they are optically coupled in series to form optical scanner 2300, which is a two-dimensional optical scanner.

The first optical scanner 2310 is similar in structure to the optical scanners described above in connection to FIGS. 19A-19C, 20A-20B, and/or 21A-21D. The first optical scanner 2310 includes a base region 2312 and a cantilevered beam 2314. Optical scanner 2310 also has a transducer assembly 2317 that includes one or more piezoelectric film actuators. In FIG. 23, a first piezoelectric film actuator 2317-1 is disposed substantially on one side wall of cantilevered beam 2314, and a second piezoelectric film actuator 2317-2 is disposed substantially on an opposite sidewall of cantilevered beam 2314. With proper bias voltages, transducer assembly 2317 enables cantilevered beam 2314 to deflect or scan in the x-z plane to form a one-dimensional optical scanner. In the embodiment of FIG. 23, optical scanner 2310 includes a single waveguide 2318 for receiving an input light beam and projecting a scanning output light beam 2319. The cantilevered beam 2314 and the associated waveguides 2318 can be referred to as a first cantilevered optical member.

The second optical scanner 2320 is similar to optical scanner 2200 of FIG. 22. As shown in FIG. 23, the second optical scanner 2320 includes a base region 2322 and a cantilevered beam 2324. Optical scanner 2320 also has a transducer assembly 2327 that includes one or more piezoelectric film actuators. In FIG. 23, a first piezoelectric film actuator 2327-1 is disposed substantially in a top plane of cantilevered beam 2324, and a second piezoelectric film actuator 2327-2 is disposed substantially in a bottom plane of cantilevered beam 2324. In this configuration, both the first piezoelectric film actuator 2327-1 and second piezoelectric film actuator 2327-2 are parallel to the first plane (the x-z plane) and orthogonal to the second plane (the x-y plane). With proper bias voltages, transducer assembly 2327 enables cantilevered beam 2324 to deflect or scan in the x-y plane to form a one-dimensional optical scanner. Similar to cantilevered beam 2204 in optical scanner 2200 in FIG. 22, cantilevered beam 2324 has a width W that is greater than its thickness T. Cantilevered beam 2324 is configured to include multiple waveguides 2328 that extend through the base portion 2322 and to provide a one-dimensional scan of multiple output light beams 2329. The cantilevered beam 2324 and the associated waveguides 2328 can be referred to as a second cantilevered optical member. The thickness T and width W can be selected to accommodate the number of waveguides needed for a particular application.

As shown in FIG. 23, the output light beam 2319 from first optical scanner 2310 is optically coupled to an input port of second optical scanner 2320. Optical scanner 2310 scans in a first direction, and optical scanner 2320 scans in a second direction that is orthogonal to the first direction. Therefore, the output light beam 2319 from optical scanner 2310 is coupled to the multiple waveguides in optical scanner 2320 in a time-sequential manner. In this configuration, the first optical scanner 2310 provides a much faster horizontal scan (in the x-z plane) than a vertical scan (in the x-y plane) provided by the second optical scanner 2320. Thus, the two-dimensional optical scanner 2300 can be configured to produce a raster scan using two one-dimensional optical scanners.

Figure 24:
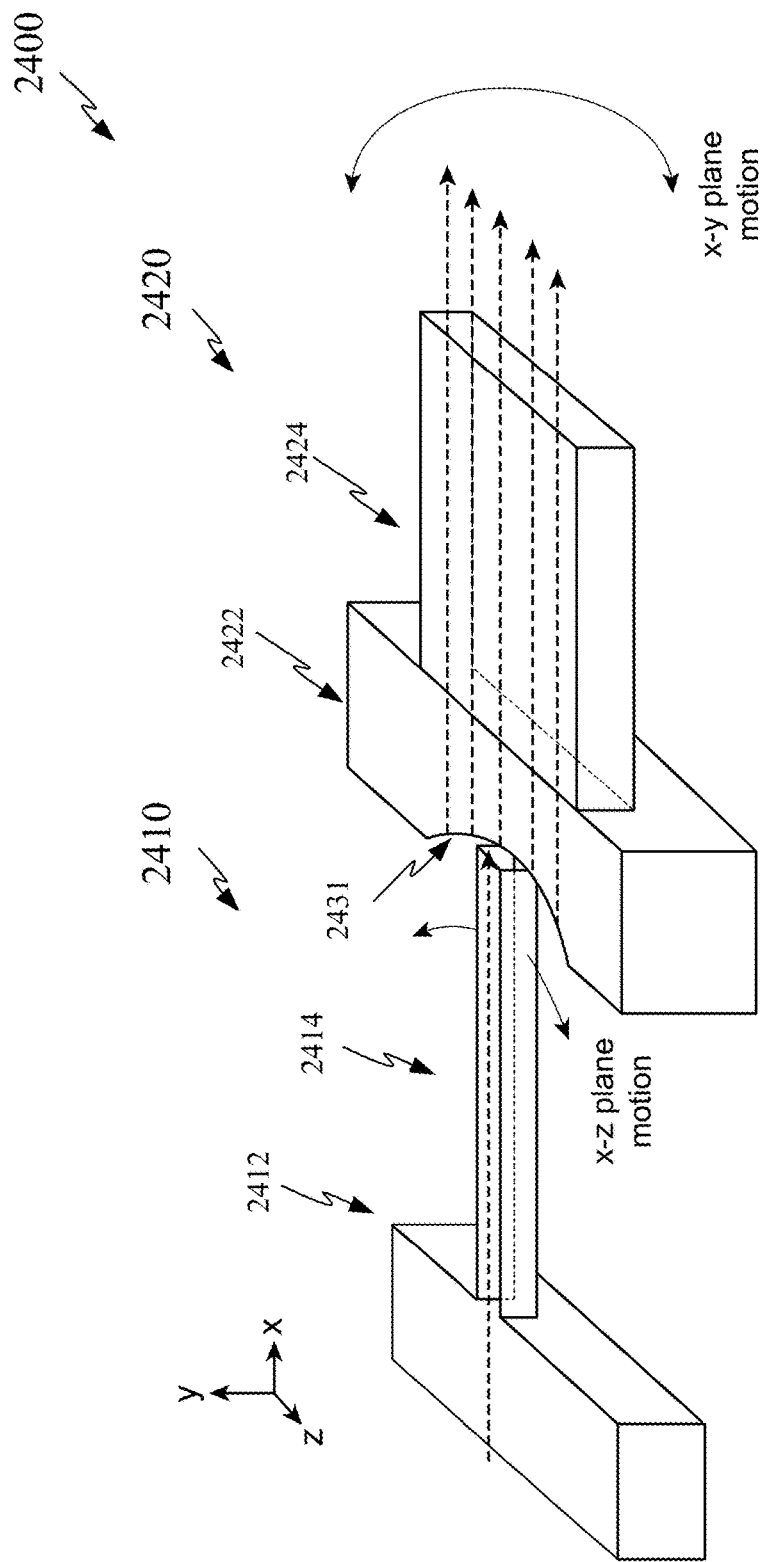
FIG. 24 shows a perspective view of two serially coupled optical scanners having cantilevered members according to an alternative embodiment of the present invention.

FIG. 24 shows a perspective view of two serially coupled optical scanners having cantilevered members according to an alternative embodiment of the present invention. As shown in FIG. 24, two-dimensional optical scanner 2400 includes a first optical scanner 2410 and a second optical scanner 2420. The first optical scanner 2410 is similar to optical scanner 2310 in FIG. 23 and the second optical scanner 2420 is similar to optical scanner 2320 in FIG. 23. Both first optical scanner 2410 and second optical scanner 2420 are one-dimensional optical scanners, but provide scans in two orthogonal planes, the x-z plane and the x-y plane, respectively. They are optically coupled in series to form two-dimensional optical scanner 2400. The first optical scanner 2410 provides a one-dimensional scan of a single light beam, and the second optical scanner 2420 receives the output light beam from the first optical scanner 2410 and provides a one-dimensional scan of multiple light beams.

The first optical scanner 2410 has a base portion 2412 and a cantilevered beam 2414. The second optical scanner 2420 has a base portion 2422 and a cantilevered beam 2424. In this configuration, the first optical scanner 2410 provides a much faster horizontal scan (in a first plane, the x-z plane) than a vertical scan (in a second plane, the x-y plane) provided by the second optical scanner 2420. Two-dimensional optical scanner 2400 can be configured to produce a raster scan using two one-dimensional optical scanners. Optical scanner 2400 is similar to optical scanner 2300 in FIG. 23. Therefore, similar components and functions are omitted here.

It is noted that the base region 2422 of the second optical scanner 2420 includes a curved section 2431 having a contour that tracks the trajectory of the tip region of cantilevered beam 2414 in optical scanner 2410 to improve the coupling between the waveguide optical scanners 2410 and 2420. In some embodiments, the distance between the tip of cantilevered beam 2414 in optical scanner 2410 and the input port of optical scanner 2420 is kept constant and small, for example, between 5 nm to 400 nm.

Figure 25:
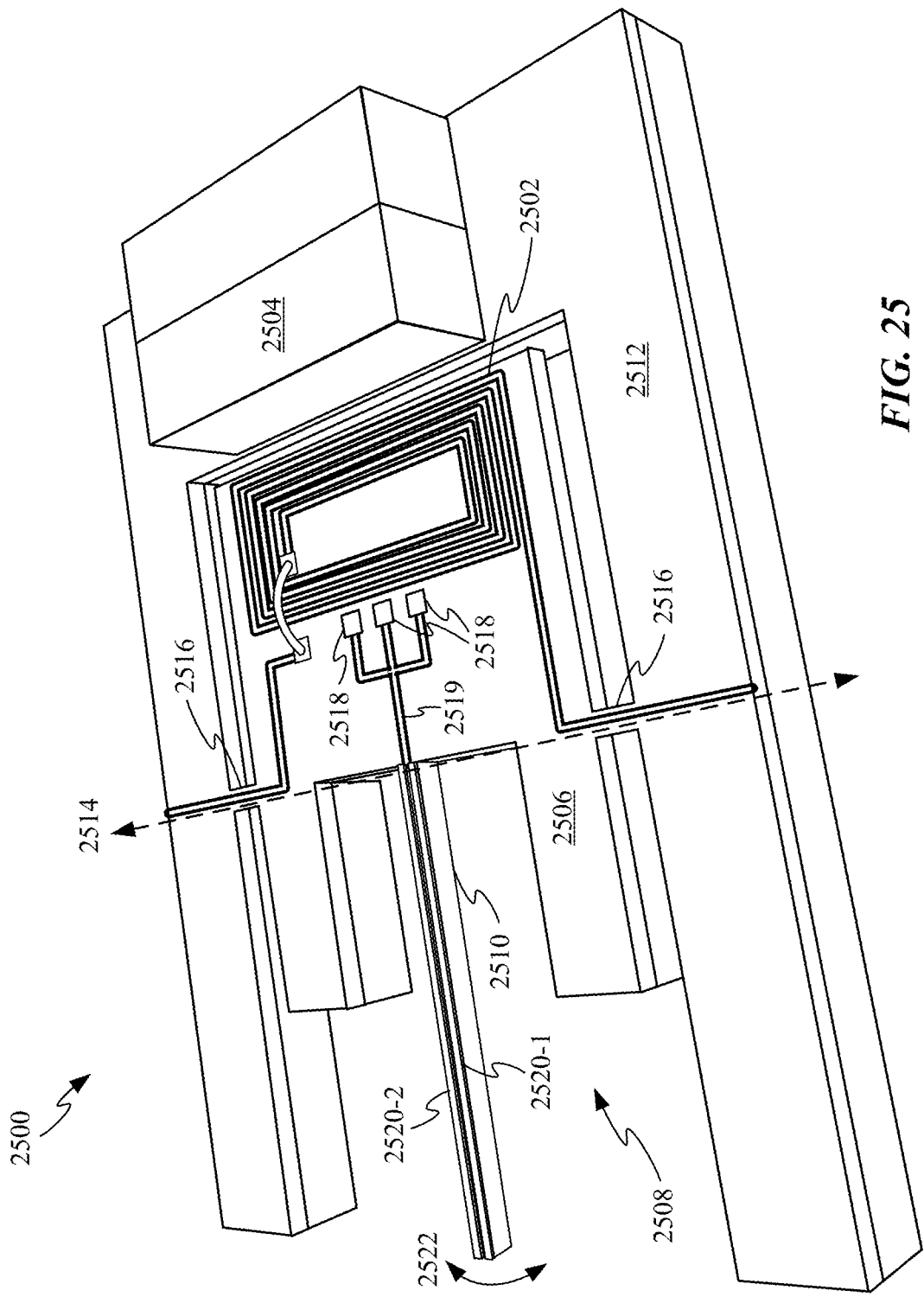
FIG. 25 shows an embodiment in which an optical scanner includes an electromagnetic coil that interacts with a permanent magnet mounted adjacent to the electromagnetic coil to generate vertical oscillation of a pivoting portion of a cantilevered beam assembly.

FIG. 25 shows an embodiment in which an optical scanner 2500 includes a flat electromagnetic coil 2502 that interacts with a permanent magnet 2504 mounted adjacent to electromagnetic coil 2502 to generate vertical oscillation of a pivoting portion 2506 of a cantilevered beam assembly 2508. Routing modulated current through electromagnetic coil 2502 generates a shifting magnetic field that interacts with a magnetic field emitted by permanent magnet 2504 to induce oscillation of pivoting portion 2506 about an axis extending through both pivoting portions 2506. A rate at which the current is modulated within electromagnetic coil 2502 can be set to achieve a desired rate of rotation of pivoting portion 2506 of cantilevered beam assembly 2508 relative to a stationary portion 2512 of optical scanner 2500 about axis of rotation 2514. Pivoting portion 2506 and stationary portion 2512 can have a thickness of about 100 microns, in some embodiments. The shape of electromagnetic coil 2502 can have a rectangular geometry that matches the shape of a region of pivoting portion 2506 in order to maximize an area across which electromagnetic coil 2502 extends. In some embodiments, spreading electromagnetic coil 2502 over a larger area in this manner allows for a stronger and/or more efficient magnetic field to be generated by electromagnetic coil 2502. It should be appreciated that the shape of electromagnetic coil 2502 can vary widely to match any desired shape of pivoting portion 2506. For example, circular, polygonal, and elliptical geometries of electromagnetic coil 2502 are also possible.

FIG. 25 also shows how the rotation of pivoting portion 2506 can be defined by flexures 2516, which connect pivoting portion 2506 to stationary portion 2512. Flexures 2516 can be sized to accommodate a desired amount of rotation of pivoting portion 2506. Flexures 2516 can be configured to establish a pathway across which one or more electrically conductive pathways is able to transmit power to energize laser diodes 2518, which generate light that is transmitted to cantilevered beam 2510 via waveguide 2519. In addition to helping transmit light, one or both of flexures 2516 can be configured to accommodate an electrically conductive pathway configured to carry electricity for powering electromagnetic coil 2502 and piezoelectric film actuators 2520-1 and 2520-2 arranged in a configuration similar to the one depicted in FIG. 19C. Piezoelectric film actuators 2520 can be configured to maneuver cantilevered beam 2510 in a direction 2522 in a plane parallel to pivoting portion 2506 by providing differential inputs into piezoelectric film actuators 2520-1 and 2520-2. In this way, piezoelectric actuators can be configured to induce horizontal movement of cantilevered beam 2510 and the combination of electrically conductive coil 2502 and permanent magnet 2504 can maneuver cantilevered beam 2510 vertically. This configuration provides a much faster horizontal scan than a vertical scan, which works well to produce a raster scan.

Optical scanner 2500 could also be configured to produce a circular scan, and this would allow optical scanner 2500 to be able to switch between different scan patterns. Switching between scan modes can be beneficial where a particular operating mode has more content toward a central region of its display than a peripheral region, as a circular scan is able to focus more light in a central region than out toward its periphery, while a raster scan is better suited for an even distribution of light across a display.

In some embodiments, optical scanner 2500 could also be configured to produce a circular scan use both magnetic and piezoelectric actuations as described above. In these embodiments, the position of the base of the piezoelectric-driven cantilever is made co-incident with the axis of rotation 2514, through the torsion bars or flexures 2516, of the magnetically driven base, so that the tip of the cantilever, in its deflection, traces out a spherical path with substantially the same radius of curvature in X and Y. In some embodiments, the position of the base of the cantilever is located such that the X and Y radius of curvature are the same, as depending on the bending mechanics/curvature of the piezo driven cantilever, its base may need to be different from the axis of rotation of the magnetically driven base to achieve equal radius of curvature of the tip motion.

In some embodiments, optical scanner 2500 could also be configured to produce a circular scan as described in the configuration accompanying FIG. 19C. In these embodiments, to transition to a circular scan pattern, pivoting portion 2506 could include a locking mechanism that prevents movement of pivoting portion 2506 relative to stationary portion 2512. While performing the circular scan, no current would need to be circulated through electrically conductive coil 2502. In this way, horizontal and vertical motion of cantilevered beam 2510 could be induced by piezoelectric film actuators 2520-1 and 2520-2.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An optical scanner, comprising:
    a cantilevered optical member;
    a base portion, the base portion comprising:
        an upper transducer assembly, wherein the upper transducer assembly includes an upper channel for accommodating the cantilevered optical member; and
        a lower transducer assembly, wherein the lower transducer assembly includes a lower channel for accommodating the cantilevered optical member; wherein the cantilevered optical member protrudes from the base portion; and
    a first pair of piezoelectric actuators coupled to the upper transducer assembly and a second pair of piezoelectric actuators coupled to the lower transducer assembly and configured to induce motion of the cantilevered optical member in a scan pattern.

2. The optical scanner as recited in claim 1, wherein the cantilevered optical member has a tapered shape with a distal end narrower than a proximal end adjacent to the base portion of the optical scanner.

3. The optical scanner of claim 1, wherein the cantilevered optical member comprises an optical fiber.

4. The optical scanner of claim 1, wherein the cantilevered optical member includes one or more enlarged diameter portions and wherein the upper channel and the lower channel are sized to accommodate the enlarged diameter portions.

5. The optical scanner of claim 1, wherein the upper channel comprises a multi-section upper channel with a plurality of upper channel segments spaced apart from one another by one or more upper openings defined by the upper transducer assembly or wherein the lower channel comprises a multi-section lower channel with a plurality of lower channel segments spaced apart from one another by one or more lower openings defined by the lower transducer assembly.

6. The optical scanner of claim 1, wherein the cantilevered optical member includes one or more metallized portions.

7. The optical scanner of claim 1, wherein the upper transducer assembly includes one or more capacitive sensing regions configured to monitor motion of the cantilevered optical member during motion or wherein the lower transducer assembly includes one or more capacitive sensing regions configured to monitor motion of the cantilevered optical member during motion.

8. The optical scanner of claim 7, further comprising an external circuit coupled to the one or more capacitive sensing regions.

9. The optical scanner of claim 7, wherein the upper transducer assembly includes two upper capacitive sensing regions or wherein the lower transducer assembly includes two lower capacitive sensing regions configured to monitor motion of the cantilevered optical member during motion.

10. The optical scanner of claim 9, wherein the upper transducer assembly includes an upper H-shaped opening positioned to electrically isolate the two upper capacitive sensing regions from one another or wherein the lower transducer assembly includes a lower H-shaped opening positioned to electrically isolate the two lower capacitive sensing regions from one another.

11. The optical scanner of claim 1, wherein the upper transducer assembly includes an upper hub portion, an upper opening, and one or more upper flexures, wherein the upper hub portion is positioned within the upper opening and suspended within the upper opening by the one or more upper flexures, or wherein the lower transducer assembly includes a lower hub portion, a lower opening, and one or more lower flexures, wherein the lower hub portion is positioned within the lower opening and suspended within the lower opening by the one or more lower flexures.

12. The optical scanner of claim 11, wherein each of the first pair of piezoelectric actuators have an end coupled to the upper hub portion or wherein each of the second pair of piezoelectric actuators have an end coupled to the lower hub portion.

13. The optical scanner of claim 1, wherein the upper transducer assembly and the lower transducer assembly comprises one or more glass frits positioned for bonding the upper transducer assembly and the lower transducer assembly to one another.

14. The optical scanner of claim 1, further comprising an adhesive positioned between the upper transducer assembly and the lower transducer assembly for bonding the upper transducer assembly and the lower transducer assembly to one another.

15. The optical scanner of claim 1, wherein the upper transducer assembly or the lower transducer assembly comprises one or more openings sized and shaped for accommodating a kinematic alignment features.

16. The optical scanner of claim 1, wherein the upper transducer assembly comprises a layer of monocrystalline silicon or wherein the lower transducer assembly comprises a layer of monocrystalline silicon.

17. The optical scanner of claim 1, wherein the cantilevered optical member comprises a silicon beam including one or more optical waveguides.

18. The optical scanner of claim 1, wherein the upper transducer assembly includes an upper pair of tapered protrusions positioned to support anchoring of the first pair of piezoelectric actuators or wherein the lower transducer assembly includes a lower pair of tapered protrusions positioned to support anchoring of the second pair of piezoelectric actuators.

19. The optical scanner of claim 1, further comprising a drive circuit coupled to the first pair of piezoelectric actuators and the second pair of piezoelectric actuators.

20. The optical scanner of claim 1, further comprising a light source optically coupled to the cantilevered optical member to direct light along the cantilevered optical member.

* * * * *